United States Patent [19]

Taniguchi et al.

[11] 4,346,978

[45] Aug. 31, 1982

[54] OPERATING AID ARRANGEMENT FOR CAMERAS

[75] Inventors: Nobuyuki Taniguchi, Sakai; Masaaki Nakai, Nara; Tokuji Ishida, Daito; Isamu Uchida, Kawachinagano, all of Japan

[73] Assignee: Minolta Camera Company, Sakai, Japan

[21] Appl. No.: 212,152

[22] Filed: Dec. 2, 1980

[30] Foreign Application Priority Data

Dec. 3, 1979 [JP] Japan .................. 54-157212
Dec. 3, 1979 [JP] Japan .................. 54-157213
Dec. 3, 1979 [JP] Japan .................. 54-157214

[51] Int. Cl.$^3$ .......................................... G03B 17/18
[52] U.S. Cl. ........................... 354/289; 354/23 D; 354/60 E
[58] Field of Search ............ 354/23 D, 60 E, 53, 354/60 L, 289; 352/170, 171; 340/521–523, 692, 384 E

[56] References Cited

U.S. PATENT DOCUMENTS 3,582,949 6/1971 Forst ........................... 340/692 X
4,270,852 6/1981 Suzuki et al. .................. 354/289 X

FOREIGN PATENT DOCUMENTS 54-107343 8/1979 Japan .
54-109838 8/1979 Japan .

Primary Examiner—L. T. Hix
Assistant Examiner—William B. Perkey
Attorney, Agent, or Firm—Jackson, Jones & Price

[57] ABSTRACT

A camera capable of informing a photographer of conditions of a camera by means of human voice, which is adapted to arrange improper camera operating conditions in a predetermined order, and to give them as warnings in a sequential manner. Further, prior to every warning statement, precursory sounds are adapted to be given, to call attention of the photographer. In addition, a camera capable of narrating the explanation of the way to handle the camera is disclosed.

25 Claims, 18 Drawing Figures

OPERATING AID ARRANGEMENT FOR CAMERAS

BACKGROUND OF THE INVENTION

This invention relates to an operating aid arrangement for cameras, and more particularly, to an arrangement to be incorporated into a camera to inform a photographer of operational conditions or operational procedures of the camera by human voice.

There have already been proposed such cameras of an audio type each adapted to be provided with a specific arrangement, with which improper photographic conditions are detected and thereafter, given as warning statements in a human voice. For example, Japanese Laid Open Patent Application (Tokkaisho) No. 54-107343 or Japanese Laid Open Application (Tokkaisho) No. 54-109838 has already disclosed such kinds of arrangements as stated above. As one of the drawbacks, since these prior arts are adapted only to give such warning statements without any precursory step, there remains such a possibility that the photographer may fail to catch a portion or the whole of the voiced warning. Further, these prior arts are adapted to give the warnings, only if the operation of the camera is rendered to be improper, in which there is not included any further operational teaching. The warning of a type stated above may be useful for those skilled in the photography, but such a simple warning may not be helpful for the beginners of photography at all. Recently improved cameras are of the type adapted to be operative in accordance with one selected operational mode. Such being the case, even if one of the conventional arrangements stated above is properly arranged to be operable for one operational mode and is incorporated into such improved camera, only the same warning is just brought about for any selected photographic operational modes, thus the photographer, sometimes, can not help hearing an unnecessary warning. On the other hand, recent cameras have been so highly improved that the photographer is required to have quite a high operation skill or knowledge for handling such cameras. Under such circumstances, it is desirable to provide a camera of the type adapted to be easily handled by the beginners of photography, in which the camera can be operative in accordance with a series of voiced statements, once one of the operational modes is selected.

SUMMARY OF THE INVENTION

Accordingly, an essential object of the present invention is to provide operating aid arrangements for cameras, which can overcome all the disadvantages inherent in the prior arts specifically described in the foregoing.

Another important object of the present invention is to provide operating aid arrangements for cameras of the above described type, which are especially adapted to be easily operable for beginners in accordance with a series of voiced statements, once one of operational the modes is selected.

A further object of the present invention is to provide operating aid arrangements for cameras of the above described type, which are simple in construction and thereby, readily incorporated into any kinds of cameras.

In accomplishing these and other objects according to one preferred embodiment of the present invention, there is provided an operating aid arrangement as will be described hereinbelow. An operating aid arrangement to be incorporated in an camera, which comprises means for detecting a camera condition, which includes means for checking a plurality of possible abnormal conditions of the camera; means for selecting a plurality of informations in a predetermined order in response to the detecting means while including means for arranging the information corresponding to the abnormal conditions checked by the checking means in the predetermined order; means for generating a voice to narrate the plurality of information in the predetermined order, in which the information to be narrated are a plurality of warnings corresponding to the abnormal conditions, respectively; and means for producing a preparatory sound to call the attention of the person to the camera prior to the narration. By such arrangement as stated above, the deficiencies inherent in the prior arts are advantageously overcome.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted here that like parts are designated by like reference numerals throughout several views of the accompanying drawings.

DETAILED DESCRIPTION OF THE INVENTION

Figure 1:
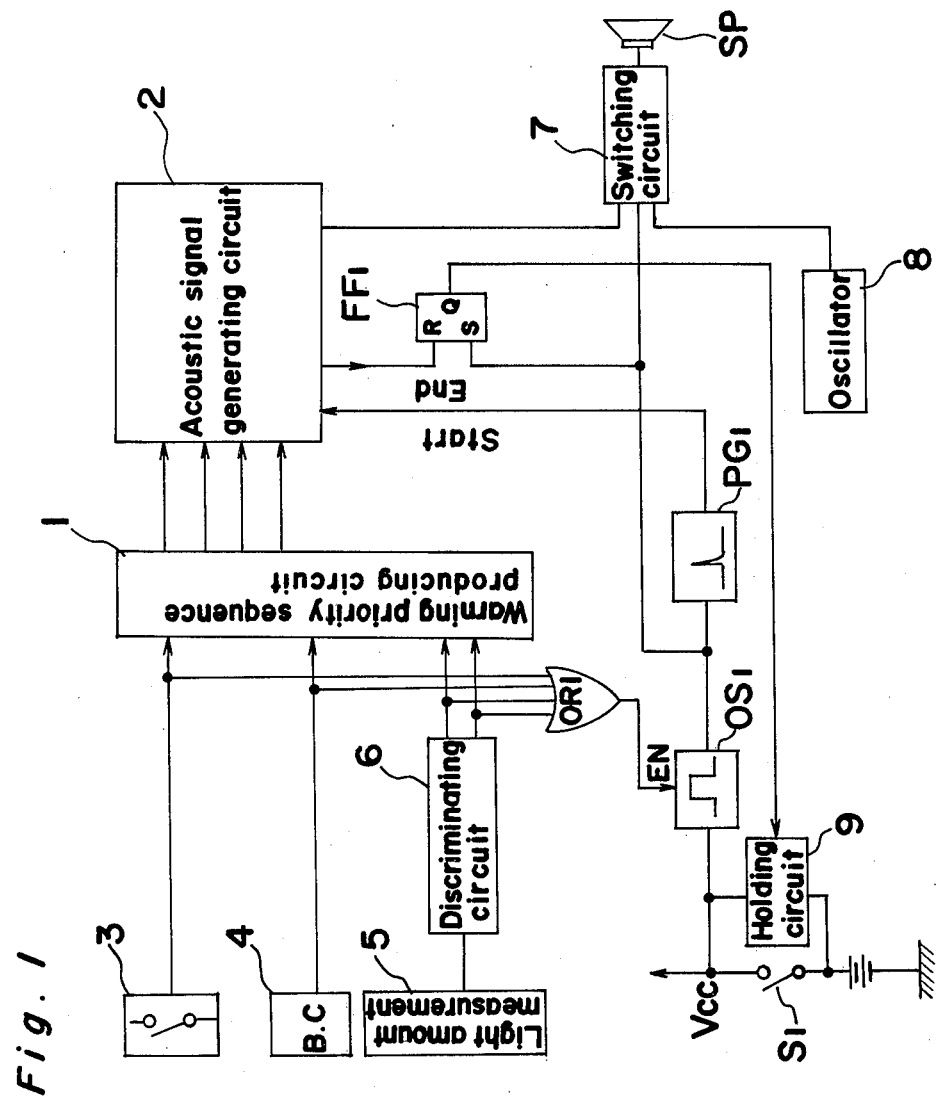
FIG. 1 is a block diagram of an operational aid arrangement for cameras, which is incorporated in a camera to inform a photographer of conditions of the camera by means of human voice, in accordance with one preferred embodiment of the present invention.

Referring now to FIG. 1, there is shown a block diagram of an entire arrangement, which is incorporated in a camera to inform a person of conditions of the camera by means of human voice, in accordance with one preferred embodiment of the invention. However, as will be further detailed in the following, this embodiment is adapted to give a specific voiced warning, which is relatively arrayed at the topmost position in a predetermined priority sequence for the conditions required to be warned. The arrangement mainly includes a warning priority sequence producing circuit 1, and an acoustic signal output (generating) circuit 2. The warning priority sequence producing circuit 1 is adapted to be input with information regarding operational conditions required to be warned and then, to array them in priority sequence in a predetermined manner, thereby to output them to the acoustic signal output circuit 2. However, the circuit 1 is of the type adapted to output the topmost informational signal in accordance with the predetermined priority sequence, whenever such informations of more than two are simultaneously inputted. The acoustic signal output circuit 2 is adapted to synthesize acoustic signals, which are convertible into voiced statements or human narrations of such information as stated above. The acoustic signals are impressed onto a speaker SP, thereby imparting the voiced warnings. This embodiment further includes another acoustic signal generating circuit, i.e. an oscillator 8, in addition to the acoustic signal output circuit 2, in which the outputs from the oscillator 8 are impressed onto the speaker SP through a switching circuit 7, so that a preparatory sound to call the attention of the person to the camera prior to every voiced warning which is produced. Further, in the arrangement as shown in FIG. 1, numeral 3 designates a circuit for checking a film winding completion, and this circuit 3 is adapted to output signals of high level, if the winding operation of the film has not yet been completed. Numeral 4 designates a circuit for checking a charging condition of a battery, in which when an output voltage of the battery (power supplied for light measuring operation, shutter releasing operation, etc.) becomes a predetermined level or less, a signal indicative of its under potential state and of the type of high level is adapted to be output. Numeral 5 designates a light measuring circuit, while numeral 6 designates a discriminating circuit, with which the signal level output from the circuit 5 is discriminated as follows. The discriminating circuit 6 is of the type adapted to output signals of high level indicative of excess brightness or signals indicative of hand blur in a case where the subject brightness is relatively dark. Respective outputs from these circuits 3, 4 and 6 are impressed onto both of the warning priority sequence producing circuit 1 and an OR circuit OR1. Numeral S1 designates a switch, which is electrically closed, upon completion of either a first staged pushing actuation of a shutter release button, or a depression of a displaying button, and through which the entire arrangement is energized. Assume that the signals of high level are being output from at least one of these circuits, i.e. 3, 4 and 6. Such being the case, when the switch S1 is fully closed, a signal is output from the OR circuit OR1 and is successively impressed onto an enable terminal EN of a one-shot circuit OS1. Accordingly, the circuit OS1 is electrically triggered, with the output signals being effected for a predetermined period. Such output signal from the circuit OS1 causes a flip-flop FF1 to be set. A set signal from the flip-flop FF1 is impressed onto a holding circuit 9 electrically connected parallelly with the switch S1, with a consequence that the holding circuit 9 is rendered to be ON. Hence, the circuitry of the arrangement is kept electrically activated, even after the manual pushing of the switch S1 is discontinued. On the contrary, when a signal is not output from either of these circuits 3, 4 and 6, i.e. there does not exist any information required to be warned, the one-shot circuit OS1 is left in an electrically nonactuating state, with the effectuation of self-retaining for switch S1 stated above being naturally not effected. Once the output is produced from the one-shot circuit OS1, such output is also impressed onto the switching circuit 7 and therefore, the oscillator 8 is alternately connected to the speaker SP by means of the switching circuit 7. Such being the case, the output of the oscillator 8 is imparted as a sound (for example, such continuous sound like "Pii-" or intermittent sound "Pi, Pi . . . ") through the speaker SP, to call the attention of person to the following voiced warning statement. The above described precursory sound is continuously given, as long as the output from the one-shot circuit OS1 exists. However, when the output of OS1 is interrupted, the speaker SP is alternately connected to the acoustic signal output circuit 2 from the oscillator 8 by means of the switching circuit 7. Further, one pulse is output from a pulse generating circuit PG1 in accordance with the fall of the output of the one-shot circuit OS1. The pulse is adapted to be impressed onto the acoustic signal output circuit 2 as a start signal. In response to this start actuation, the acoustic signal output circuit 2 having retained a specific warning signal selected with the warning priority sequence producing circuit 1 starts its operation, in which a program for use in synthesizing human voiced statement corresponding to the kind of the warning signal is first selected and successively, the acoustic signal is adapted to be output as the voiced statement with the speaker SP. Soon after the voiced statement is executed, an end signal output from the acoustic signal output circuit 2 is impressed onto the flip-flop FF1, thereby to reset the flip-flop FF1. The holding circuit 9 is now rendered to be OFF.

Figure 2:
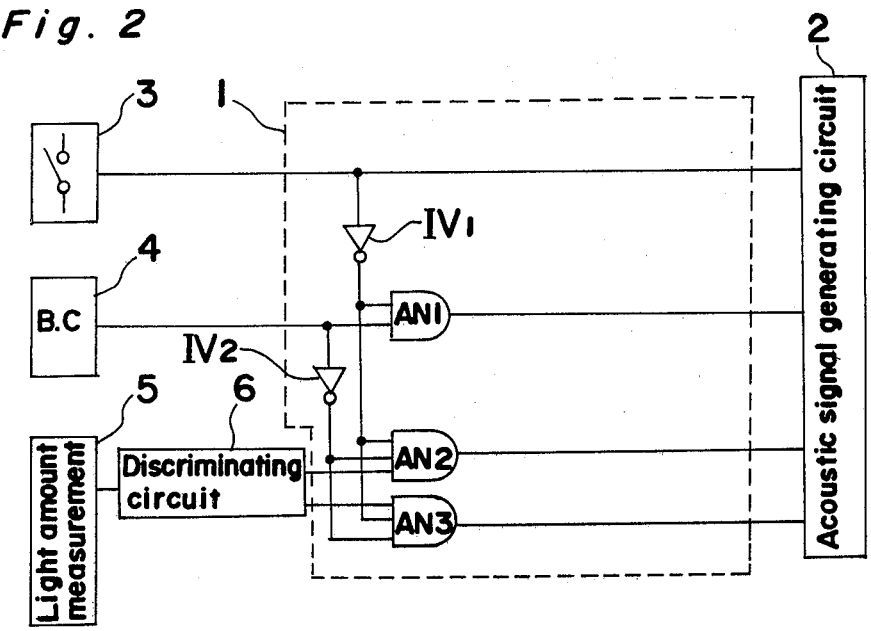
FIG. 2 is a block diagram of a warning priority sequence producing circuit constituting the operational aid arrangement for cameras shown in FIG. 1.

Referring now to FIG. 2, there is shown a detailed circuitry construction of the warning priority sequence producing circuit 1, in which the priority sequence is specified that the warning of the incompletion of the film winding is given the first priority, with the warning of an unsatisfied charging condition of the battery and the warning of the excess subject brightness or of the hand blur being chosen as the second and the third, respectively. Since effectuations of the excess subject brightness and the hand blur can not be compatible with each other, these two are treated as relatively equivalent information here. Assume that high-level signals are being output from each of these circuits 3, 4 and 6, subject to the incompletion of the film-winding, decrease of the charged potential of the battery from the predetermined level, and excess high or low subject brightness, respectively. Such being the case, the output from the circuit 3 for checking the incompletion of the film winding is first inverted with an inverter IV1 and the consequent inverted signal is impressed onto respective AND circuits AN1, AN2 and AN3. As a result, these AND circuits are brought into respective non-outputting states and therefore, the signal indicative of the information of the incompletion of the film-winding is only impressed onto the acoustic signal output circuit 2. Soon after the film is finished being wound, the signal from the circuit 3 is ceased, in which in accordance with the open actuation of the AND circuit AN1, the signal indicative of the decrease of the charged potential of the battery is impressed onto the AND circuit AN2. Similarly, in such case as stated above, the signal output from the circuit 4 is inverted with an inverter IV2 and the consequent inverted signal thereof is impressed onto respective AND circuits AN2 and AN3, respectively. As a result, both of the AND circuits AN2 and AN3 are maintained in their non-outputting states. When the completion of the film winding and the adequate charging state of battery are both satisfied, the warning signal concerning the subject brightness can be impressed onto the acoustic signal output circuit 2.

Figure 3:
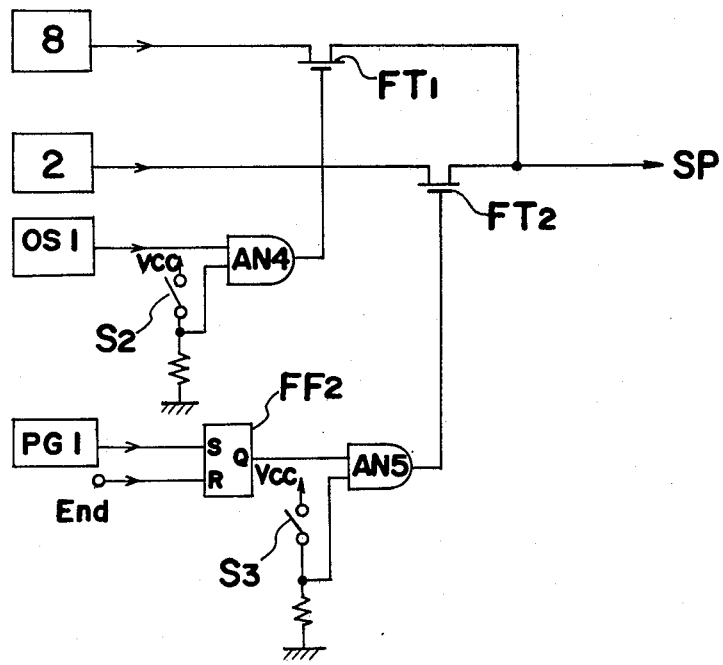
FIG. 3 is a block diagram of a switching circuit constituting the operational aid arrangement for cameras shown in FIG. 1.

Referring now to FIG. 3, there is shown a detailed circuitry construction of the switching circuit 7. In this diagram, switches S2 and S3, which are manually operable, are provided. A case where the switches S2 and S3 are kept closed, will be first described hereinafter. In this case, both of AND circuits AN4 and AN5 remain conductive. As described with reference to FIG. 1, the one-shot circuit OS1 is operated to generate an output signal from the circuit OS1 for a given time period. The signal is impressed on a gate FT1 of a switch FET through an AND circuit AN4 to render the gate FT1 conductive. On the other hand, a gate FT2 of the switch FET is maintained in an electrically non-conductive condition and therefore, the speaker SP, which is being impressed with the output from the oscillator 8, continuously imparts the precursory sound. However, when the output from the one-shot circuit OS1 is ceased, the gate FT1 is rendered to be OFF, while in accordance with the fall of the output of the one-shot circuit OS1, the pulse generator PG1 is actuated to generate the pulse signal as described earlier. The flip-flop FF2 is successively set through the above-described pulse signal and then, a set signal output from the flip-flop FF2 causes the gate FT2 of the FET switch to be conductive. Accordingly, the acoustic signal from the acoustic signal output circuit 2 is capable of being impressed. Upon completion of effectuation of the voiced warning, the acoustic signal generating circuit 2 outputs the end signal, which is impressed onto and then, resets the flip-flop FF2. Such being the case, the gate FT2 is rendered to be OFF, with the circuitry being restored to such condition as having not been provided with the start signal stated above. When the switch S2 is kept opened, neither the AND circuit AN4, nor the gate FT1 is rendered to be conductive, irrespective of the operation of the circuit OS1, and therefore, the precursory sound is never imparted. However, only the warning narrations are imparted, when the output of the circuit OS1 is ceased. Namely, as is clear from the description in the foregoing, the manual switch S2 is rendered to be opened in a case where the precursory sound is not needed. On the other hand, when the switch S3 is kept opened, neither the AND circuit AN5, nor the gate FT2 is rendered to be conductive, thus resulting in no language warnings. Assuming that the switch S2 is kept closed, with the switch S3 being opened, only the precursory warning sounds are produced, to indicate to a person of the existence of some improper operational conditions of the camera. Assuming that the switches S2 and S3 are both kept opened, neither the precursory warning sounds, nor the warning narrations are given.

Figure 4:
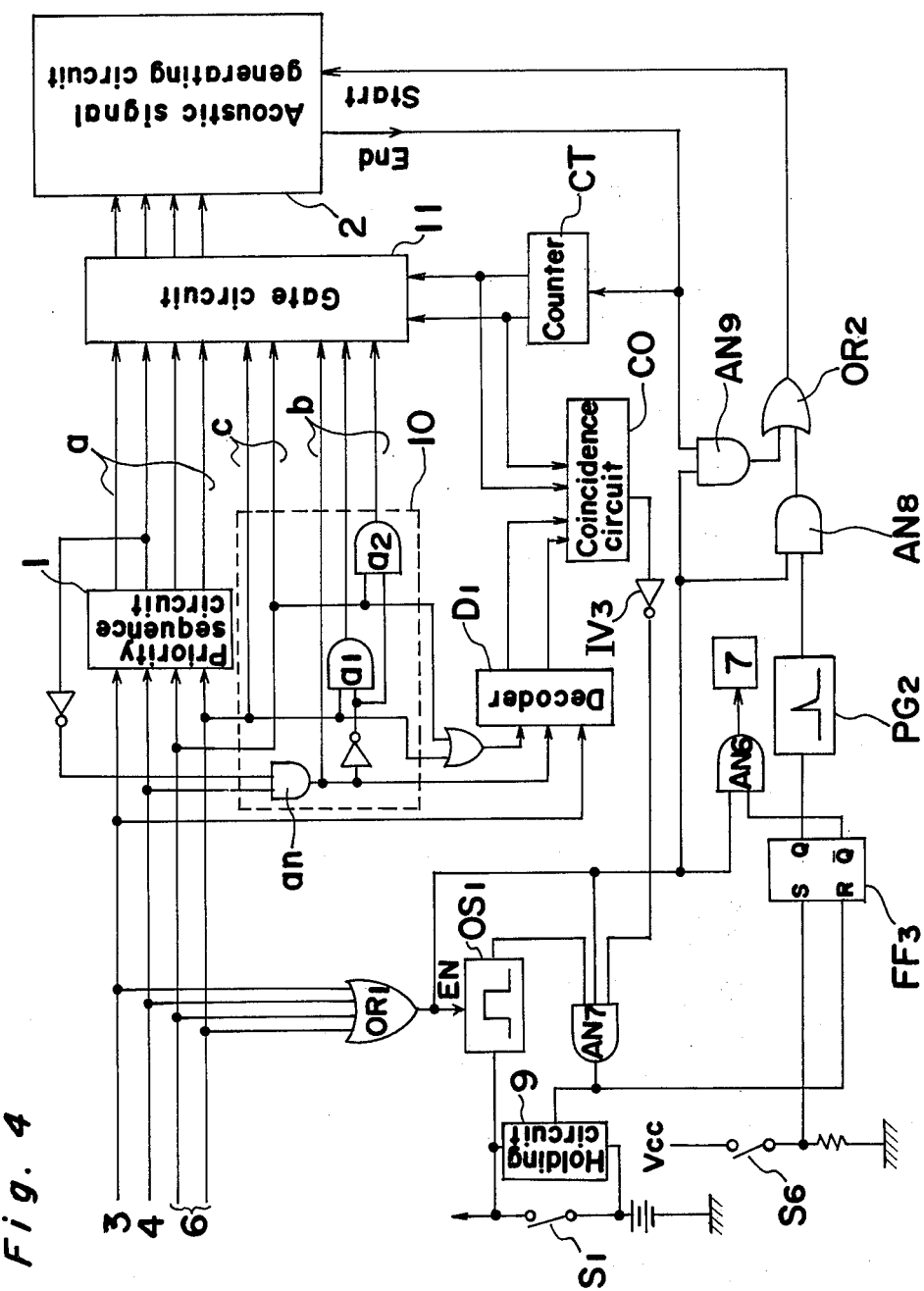
FIG. 4 is a view similar to FIG. 1, particularly showing one modified embodiment of FIG. 1, which can give a plurality of voiced warning statements one by one in accordance with a predetermined priority sequence in a case where more than two conditions required to be warned exist.

FIG. 4 illustrates one modified embodiment of the present invention, which can give a plurality of voiced warning statements one by one in accordance with a predetermined priority sequence in a case where the conditions required to be warned exist by more than two. On the contrary, the former embodiment is adapted to give only one voiced statement, which is relatively arrayed at the topmost position in the predetermined priority sequence for the conditions required to be warned. Like parts are designated by like reference numerals throughout the drawings for the former embodiment and for this modified embodiment. For the sake of convenience of the explanation, the following wordings will be defined. The signal output from the circuit 3 is referred to as film winding incompletion signal, while the signal output from the circuit 4 is referred to as BU (battery under) signal. Further, the signal indicative of the excess subject brightness and the signal indicative of the hand blur both of which are output from the circuit 6, are generally referred to as improper subject brightness signal. In addition, it is to be noted here that when the wording of a first warning is referred to, the wording is to include a case where only one type of warning for a sole operational condition is required. The functional characteristics of a warning priority sequence producing circuit 2 is similar to that shown in FIG. 1, in which the circuit 1 is of the type adapted to output the topmost informational signal in accordance with the predetermined priority sequence, whenever information of more than two are simultaneously input. The signals output from the circuit 1 is referred to as signals of "a" group. The signals of a "a" group include the film winding incompletion signal, the BU signal, and the improper subject brightness signal. The film winding incompletion signal always corresponds to a first priority or the topmost warning. The BU signal corresponds to the first warning, as long as the film winding incompletion signal does not exist, and ordinarily corresponds to a second warning. The improper brightness signal can take the position of either of the first, the second, and a third sequences according to such arraying rule as described above. A circuit 10 enclosed by a dotted line designates a multiplex priority sequence producing circuit, upon which the BU signal and two types of improper brightness signals are adapted to be applied. Further, the circuit 10 is capable of outputting a signal corresponding to the above-described second signal as a signal of "b" group, while the above-described third signal is output as a signal of "c" group, respectively. The "b" group includes the BU signal and the improper subject brightness signal. The BU signal output from a circuit 4 is adapted to be directly output as the "b" group through the circuit 10. When the BU signal exists in the presence of the film winding incompletion signal, the improper subject brightness signal can not belong to the "b" group, but can correspond to the third warning. Thus, the signal output from the circuit 6 is further output as the "b" group signal through AND circuits a1 and a2, upon which an inverted signal of the BU signal is applied. With respect to the "c" group, the improper subject signal output from the circuit 6 is adapted to be directly output as the "c" group signal. Respective "a", "b", and "c" group signals are impressed onto a gate circuit 11. When only one type of warning condition exists, only the "a" group signal is impressed onto an acoustic signal generating circuit 2 through the gate circuit 11. Such being the case, either one of the film winding incompletion signal, BU signal, and subject brightness signal is output from one of the corresponding circuits 3, 4 and 6, thus resulting in its corresponding warning. When the warning conditions of more than two types are involved, the gate circuit 11 imparts the signal of the "a" group to the acoustic signal generating circuit 2, thereby to give the first warning and thereafter, the signal of the "b" group to the circuit 2. For example, when the film winding incompletion signal and the BU signal are both output from their respective circuits, only the film winding incompletion signal is output as the "a" group signal, with the BU signal being output as the "b" group signal. Such being the case, the warning of the film winding incompletion signal is first given and then, the warning of the "battery under" is given, accordingly. Further, when the BU signal and the improper subject brightness signal are being output, the BU signal is output as the "a" group signal, with the improper subject brightness signal being output as the "c" group signal. Such being the case, since the BU signal output as the "a" group signal is inverted and thereafter, is input to an AND circuit "an", the AND circuit "an" is rendered to be non-conductive, whereby the BU signal is not output as the "b" group signal and upon respective conductions of the AND circuits a1 and a2, the improper subject brightness signal is output as the "b" group signal. When three types of warning conditions simultaneously exist, the film winding incompletion signal is output as the "a" group signal, while the BU signal is output as the "b" group signal. In addition, since the respective AND circuits a1 and a2 are rendered to be non-conductive, the improper subject brightness signal is output as the "c" group signal. The gate circuit 11 first permits the "a" group signal to be impressed onto the acoustic signal generating circuit 2, and thereafter, the "b" group signal and the "c" group signals are sequentially impressed onto the circuit 2. The function of the gate circuit 11 is controlled through an output of a counter CT. The respective film winding incompletion signal, BU signal and improper subject brightness signal are impressed onto a decoder D1. The decoder D1 outputs a signal of (01) in accordance with the input of only one type signal, while a signal of (10) is to be output in accordance with the inputs of two types of signals. Further, when the three types of signals are simultaneously input into the decoder D1, a signal (11) is output. A symbol CO designates a coincidence circuit, which compares an output from the counter CT and an output from the decoder D1 and then, outputs a coincidence signal, when such outputs are coincident with each other. At a time when the switch S1 is actuated to be closed, an output from the counter CT is adapted to be of (00), so that the number of end signals of each output from the acoustic signal generating circuit 2 can be counted. When the output from the counter CT is of (00), the gate circuit 11 selectively permits the "a" group signal to be applied onto the circuit 2. Soon after the effectuation of the first warning, the end signal is output from the circuit 2, to render the consequent output (01) of the counter CT, and thereafter, the gate circuit 11 permits the "b" group signal to be impressed onto the circuit 2. Similarly, soon after the effectuation of the second warning, the end signal is output from the circuit 2, to render the successive output (01) of the counter CT, and thereafter, the gate circuit 11 permits the "c" signal to be impressed onto the circuit 2. Soon after the effectuation of the third warning, the end signal is output from the circuit 2, to render the consequent output (10) of the counter. When the operational condition to be warned is only one, the output from the decoder D1 is rendered to be (01). Such being the case, soon after the effectuation of the first warning, the output from the counter CT is rendered to be (01), resulting in a coincidence signal is output from the coincidence circuit CO and then, the warning operation is finished. Similarly, when the condition to be warned is of three types, the output from the decoder D1 is rendered to be (11). Such being the case, soon after the effectuation of the third warning, the output from the counter CT is rendered to be (11), with a consequence of a finish of the warning operation.

The operational characteristics of the entire circuit shown in FIG. 4 will be described in the following. When either one of the circuits 3, 4 and 6 outputs the signal, it is impressed onto the enable terminal EN of the one-shot OS1 through the OR circuit OR1. Upon completion of the closure of the switch S1, the circuit OS1 can function. According to this embodiment, the circuit OS1 is adapted to only serve for causing the switch S1 to be self-retained. At a moment when the circuit S1 is rendered to be ON, since any signal is not output from the coincidence circuit CO, the output from the circuit OS1 is impressed onto a holding circuit 9 through an AND circuit AN7, thus making the holding circuit AN7 be conductive. Further, in response to the output from the AND circuit AN7, a flip-flop FF3 is reset and then, the reset signal therefrom causes an AND circuit AN6 to be rendered conductive. Accordingly, the output from the OR circuit OR1 is impressed onto a switching circuit 7 through the AND circuit AN6 and thus, an oscillator is alternately connected to a speaker (not shown here) with the switching circuit 7, thus the precursory sound being imparted. Such being the case, provided that a switch S6 is depressed, the AND circuit AN6 is closed through the resetting of the flip-flop FF3. Accordingly, since the speaker is electrically connected to the acoustic signal generating circuit 2 with the switching circuit, the imparting of the precursory sound is stopped. Further, a pulse generator PG2 is actuated through a rise step of the set signal output from the flip-flop FF3, and a consequent pulse generated is impressed onto the acoustic signal generating circuit 2 through an AND circuit AN8 and the OR circuit OR2 as the start signal of the circuit 2. As a result, the first voiced warning is provided from the speaker, while upon completion of this narration, an end signal is output from the circuit 2, to make the counting of the counter CT proceeded from a state (00) to a state (01). As described above, if the coincidence circuit CO successively outputs the coincidence signal, the holding circuit 9 is rendered to be opened through the close of the AND circuit AN7, with a consequence of the finish of the sequential warning operation.

Figure 5:
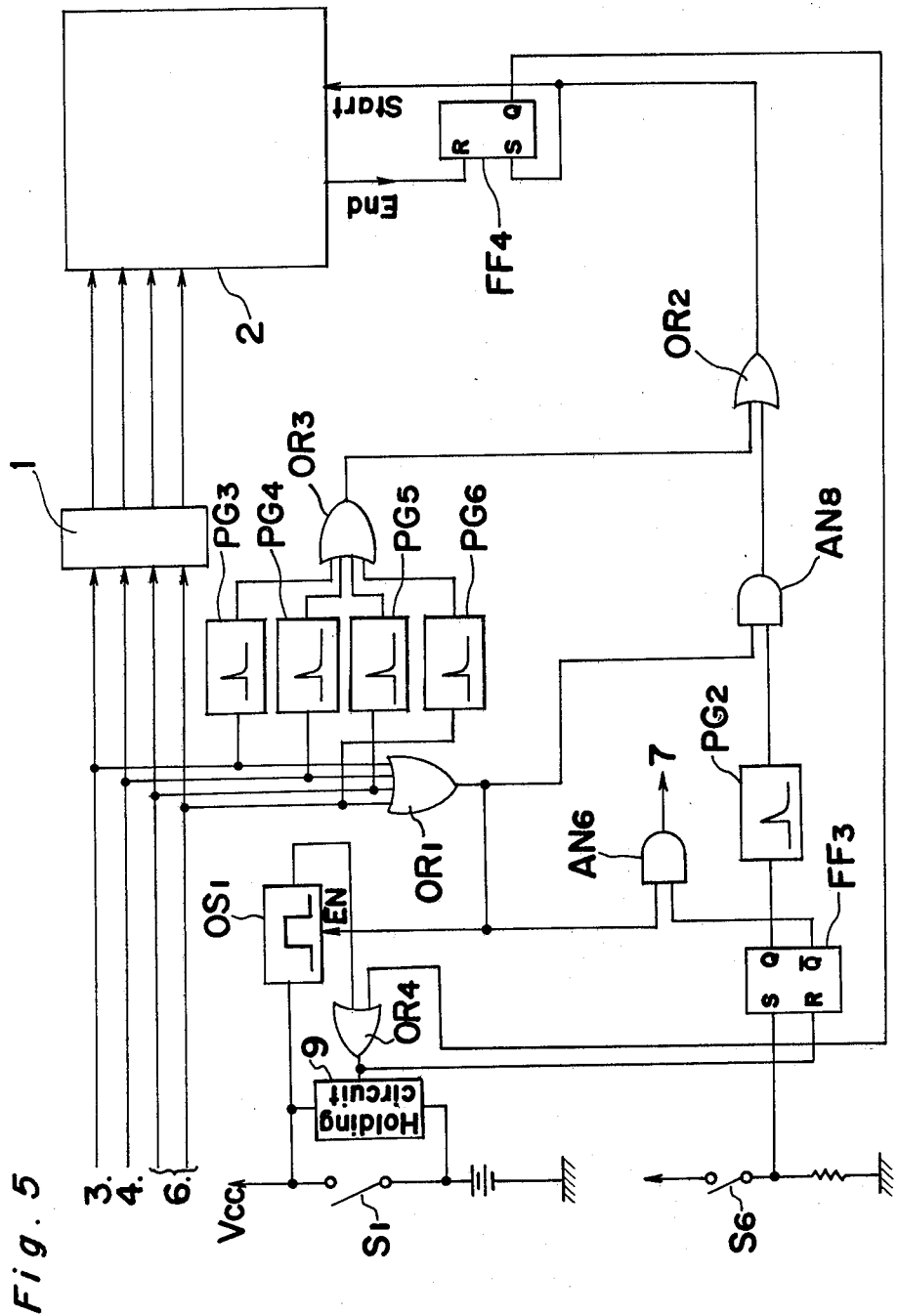
FIG. 5 is a view similar to FIG. 1, particularly showing one further modified embodiment of FIG. 1, which can give a succeeding voiced warning, subject to the conditions that a former warning in the priority sequence is voiced and is operationally cleared off, when a plurality of warning conditions are involved.

Referring now to FIG. 5, there is shown a still further modified embodiment of the present invention. This arrangement is adapted to give a succeeding voiced warning, subject to the condition that a former warning in the priority sequence is voiced and is operationally cleared off, when a plurality of warning conditions are involved. For the sake of the convenience of the explanation, like parts are designated by like reference numerals throughout the drawings for the former embodiments and for the present modified embodiment. Assume that the three type signals, i.e. the film winding incompletion signal, the BU signal, and the improper subject brightness signal, are being output from respective circuits. Soon after a switch S1 is rendered electrically closed, the precursoly sound is given, while upon completion of the closure of a switch S6, a flip-flop FF3 is set and then, a first start signal is to be impressed onto an acoustic signal generating circuit 2. Hence, the first warning is voiced from a speaker. When the film winding is completed, a pulse generator PG3 generates a pulse in response to the negative edge of an output from a circuit 3, the pulse of which is impressed onto the circuit 2 as a start signal through respective OR circuits OR3 and OR2. However, since the film winding completion signal input through the circuit 3 has already been cleared off in the priority sequence generating circuit 2, the circuit 1 outputs the BU signal output from the circuit 4. The BU signal is further impressed onto the acoustic signal generating circuit 2, with a consequence of voiced warning of the "battery under". Soon after the warning of the "battery under" is completed, with such condition being cleared off, a pulse generated with a pulse generator PG4 is further impressed onto the circuit 2 as a start signal, thus resulting in the third voiced warning. When the third warning is completed, the end signal is output therefrom, to caused an flip-flop FF4 to be reset, to make the Q signal of the flip-flop FF4 rendered to be zero. Accordingly, in a case where the output from the one-shot circuit OS1 has already been rendered to be zero, the holding circuit 9 is rendered to be OFF and therefore, an electrical supply to the circuit is interrupted. The flip-flop FF4 is adapted to be set in response to the imparting of the starting pulse to the circuit 2, wherein the flip-flop FF4 can serve to retain the conductive condition of the holding circuit 9.

Figure 6:
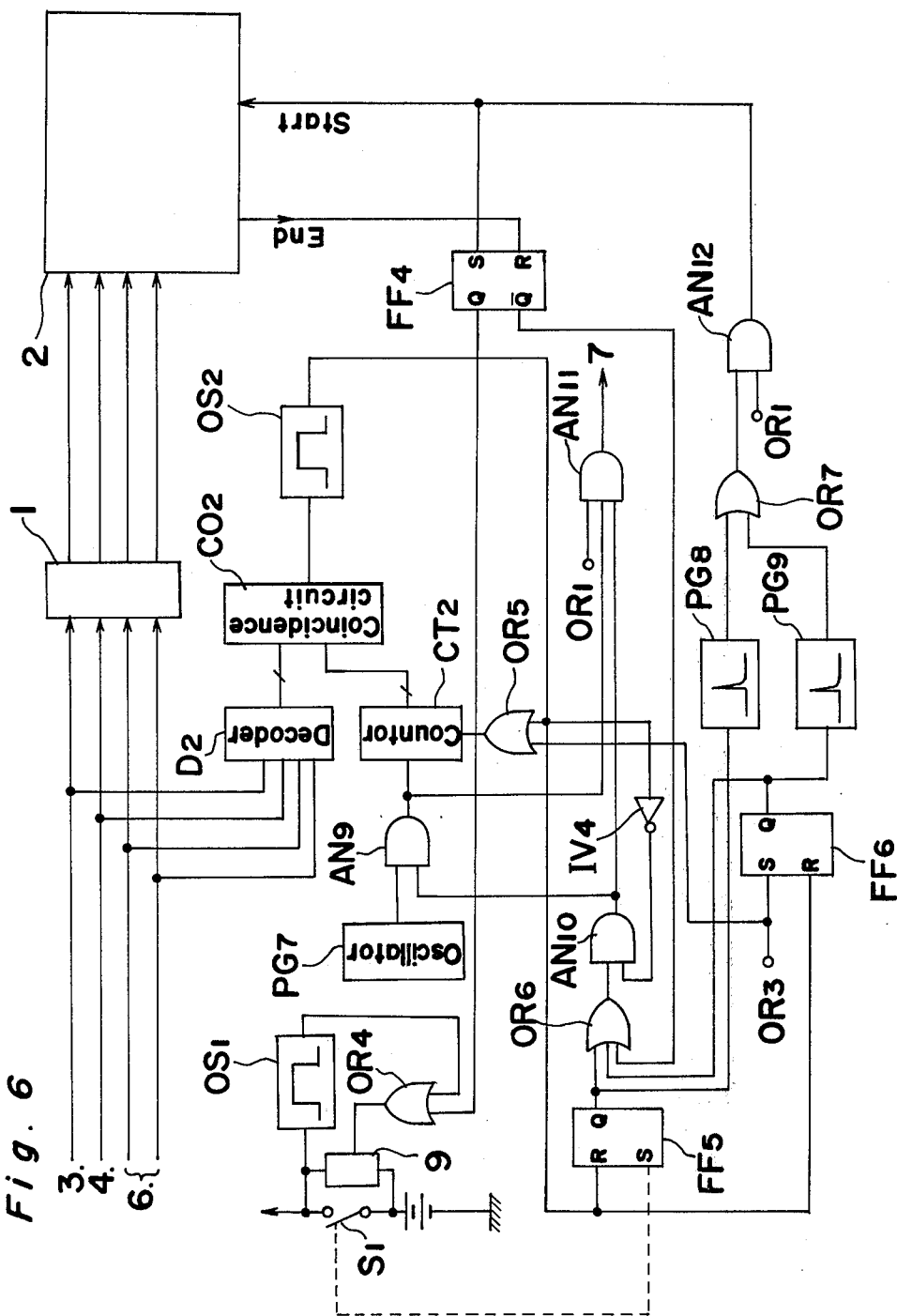
FIG. 6 is a view similar to FIG. 1, particularly showing a still further modified embodiment of FIG. 1, which is characterized in that the number of the warnings remaining unvoiced can be acoustically displayed by corresponding number of intermittently given signals such as "Pi, Pi, . . . "

Referring now to FIG. 6, there is shown a fourth embodiment of the present invention, which is characterized in that the number of the warnings remained unvoiced can be acoustically displayed by corresponding number of intermittently given signals such as "Pi, Pi . . . ". Symbol D2 designates means for imparting such acoustic warning signal as stated above. The number of the acoustic warning signals is compared with digital signal output from the counter CT2 with a coincidence circuit CO2. Symbol PG7 designates a pulse oscillator, a pulse width of which is corresponding to a time period of one acoustic warning signal such as "Pi". An output from the oscillator PG7 is impressed onto a switching circuit 7 through an AND circuit AN11. The number of the outputs from the oscillator PG7 is counted by means of the counter CT2, in which the precursory sounds are prevented from being imparted, when the number of the output from the oscillator PG7 is coincident with the number counted up with the counter CT2. As is clear from the above description, the intermittently given precursory sounds are always corresponding to the number of the warning conditions remained unvoiced. The details of the circuit shown in FIG. 6 will be further described in the following.

Provided that the switch S1 is actuated to be closed, the output of the one-shot circuit OS1 is retained in a condition of "HIGH" for a certain time period to perform the power supply retention in a case where the number of the warning conditions is more than one. Symbol FF5 designates a flip-flop, which is adapted to be set in accordance with the completion of the close of the switch S1, in which the set signal output from the flip-flop FF5 is input into an AND circuit AN11 through a respective circuit designated by OR6 and AN10. A symbol, D2 designates a decoder, which counts the number of such precursory sounds as stated above. The output from the decoder D2 as well as the output from the counter CT2 are both adapted to be impressed onto the coincidence circuit CO2. The pulse output from the generator PG7 is also input into the AND circuit AN11 through the AND circuit AN9 and, the output from the circuit AN11 is adapted to be input into a circuit 7. Accordingly, the precursory warning sounds such as "Pi, Pi . . . " whose imparting intermittence is determined through the function of the oscillator PG7, are successively given. When the number of the pulses output from the oscillator PG7 and the number of the intermittent, precursory warning sounds are coincident with each other, the output of the circuit CO2 is rendered to be "HIGH". Hence, the output from the one-shot circuit OS2 is also rendered to be "HIGH" for a predetermined time period, and therefore, a flip-flop FF5 is reset through such output from the circuit OS2, thus resulting in that the precursory warning sound is prevented from generation. Further, the counter CT2 is reset through the output from the circuit OS2. A pulse generating circuit PG8 is adapted to generate a pulse in response to the input of the negative edge of the signal output from the flip-flop FF5. The pulse generated with the circuit PG8 is impressed onto the circuit 2 as a start signal, thereby to give the voiced warning statement. The pulse from the circuit PG8 also serves for rendering the flip-flop FF4 to be set. Upon completion of the voiced warning as stated above, the end pulse is output from the circuit 2, to reset the flip-flop FF4. Such being the case, an output from a terminal "Q" of the flip-flop FF4 is rendered to be "HIGH", and therefore, pulses whose number corresponds to the number of the warning conditions are repeatedly output, to give such precursory warning signals as described above, again. Successively, when the content of the warning is renewed, a pulse notifying the person of the decrease of the number of the warning conditions, which is output from the circuit OR3, is input into a flip-flop FF6 and then, the flip-flop FF6 is set. According to this set signal, the pulses whose number is equivalent to the number of the precursory warning signals, are again input into the circuit 7. Upon effectuation of such coincidence in number as stated above, the output of the circuit OS2 is rendered to be "HIGH" and therefore, the flip-flop FF6 is reset, resulting in that the precursory warning is finished. Through the negative edge of the signal output from the flip-flop FF6, the circuit PG9 is triggered and then, generates a pulse. The consequent pulse stated above is input into the circuit 2 as the start signal and, soon after an effectuation of the voiced warning, the flip-flop FF4 is again reset through the end pulse output from the circuit 2. Successively, the pulse whose number corresponds to the number of acoustic warning signals are repeatedly input into the circuit 7, to give the precursory warning sounds as described above. As described hereinabove, this embodiment is quite effective, since the number of warning conditions remaining can easily be given to the photographer.

As is clear from the description in the foregoing, as for the warning conditions, the four types of conditions relating to the film winding, the charging condition of the battery, the excess subject brightness, and the hand blur are referenced. However, as for other warning required conditions, there can be considered conditions such as a warning relating to a subject locally excess brightness (each portion of the subject is excessively different with each other in respect to the subject brightness), a warning notifying the photographer that the exposure is being corrected, a warning notifying the photographer that an electronic flash is not being interlockked or the electronic flash has not yet been charged, a warning notifying the photographer that it is not possible to execute an AF (auto-focus) distance measurement etc. These can be easily embodied on the basis of such inventional concept as specifically described hereinabove.

Figure 7:
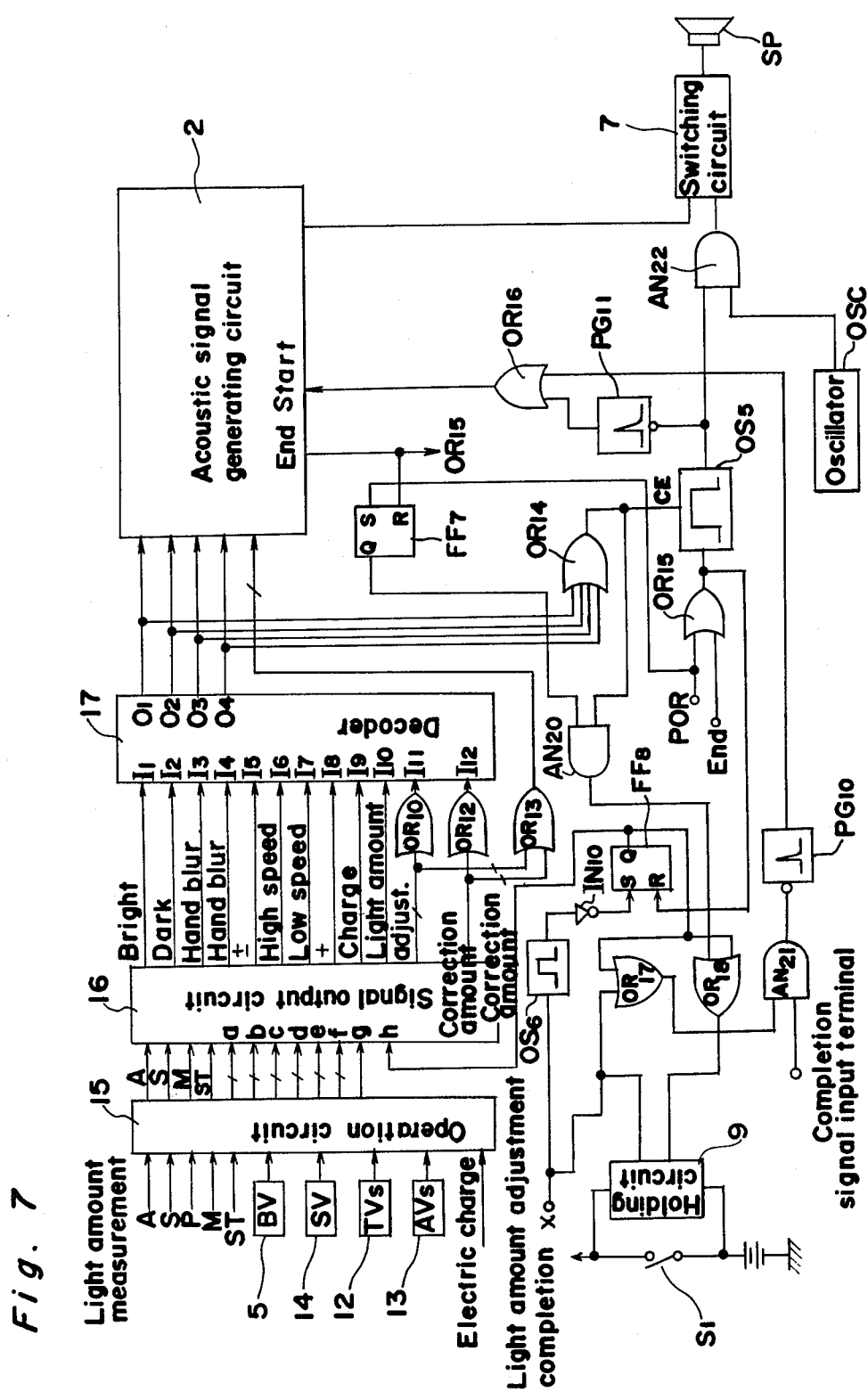
FIG. 7 is a view similar to FIG. 1, particularly showing a further modified embodiment of FIG. 1, in which following a detection warning required signal, an arrangement is adapted to judge as to whether the detected signal is indispensably acoustically warned or not, while taking into account various target conditions of the camera.

FIG. 7 illustrates a block diagram of an entire arrangement in accordance with a fifth embodiment of the present invention. According to this embodiment, following the detection of the warning required signal, the arrangement is adapted to judge as to whether the detected signal is indispensably acoustically warned or not, depending upon various targetting conditions of the camera. Thus, when such warning signal is judged to be warned, the warning signal is adapted to be impressed onto the acoustic signal generating circuit. In FIG. 7, numeral 15 designates an operation circuit, upon which the following informational signals are impressed, i.e. a subject brightness information Bv output from a light measuring circuit 5, a film sensitivity information Sv output from a film sensitivity measuring circuit 14, a shutter speed information Tvs output from a shutter speed input circuit 12 irrespective of either in an exposure time-priority automatic mode or in a manual mode, an aperture value information Avs output from an aperture value input circuit 18 for either in an aperture priority automatic exposure mode or in a manual mode, a charge completion signal of a main capacitor output from a flashing means, and a selected photographic mode signal, respectively. Thus, subject to these inputs of the photographic information, the operation circuit 15 is adapted to output an exposure control signal of a specific exposure information priority mode.

More specifically, by way of example, the operation circuit 15 calculates an exposure value Ev on the basis of Bv and Sv, while it calculates an aperture value on the basis of Bv, Sv and Tvs if in an exposure time-priority automatic exposure mode (S mode). If in an aperture-priority automatic exposure mode (A mode), an exposure time is calculated with the respective information Bv, Sv and Avs. Further, if in a program-priority automatic mode (P mode), both of Tv and Av are calculated with Bv in accordance with a predetermined program sequence. In the circuit 15, respective terminals A, S. P, M and ST sequentially corresponds to respective setting mode information inputs of the aperture-priority automatic mode, the exposure time-priority automatic mode, the programmed automatic mode, the manual mode, and a flash photographic mode, respectively. Numeral 16 designates a signal output circuit, which is adapted to detect a warning required condition on the basis of the information output from the circuit 1 and thereafter, to output the selected information to a decoder 17. The decoder 17 is adapted to convert a signal output from the circuit 16 (all of these signals are of twelve kinds as can be seen in FIG. 7) into a specific four bit type signal, which is further impressed onto an acoustic signal generating circuit 2. The acoustic signal generating circuit 2 is adapted to synthesize an acoustic signal of a warning statement, which is specified by the four bit type signal output from the decoder 17. The synthesized acoustic signal is successively impressed onto a speaker SP, thereby to impart a corresponding voiced warning. In FIG. 7, lines with oblique dashes for respective connections mean parallel transmission lines of plural bit type signals.

The circuit construction of the arrangement shown in FIG. 7 will be described hereinafter, in which the photographic modes except for the flash photographic mode may be referenced for the sake of convenience of the explanation. Upon completion of a first staged depression of a shutter release button or the depression of a displaying button, a switch S1 is closed (the switch S1 is opened without fail, upon completion of a shutter release). When the switch S1 is closed, the entire circuit shown in FIG. 7 is electrically fed. Such being the case, if either the camera or the subject to be photographed is left in a condition where some warnings are required, at least one signal is output through at least one of four connecting lines extended from the decoder 17. Further, in accordance with the electric power supply to the circuit, a preset signal output from a power-on-reset circuit (not shown here) is impressed onto a power-on-reset terminal POR (see, centrally lower portion in the drawing), to set a flip-flop FF7. Since an AND circuit AN20 is rendered to be conductive through a set-signal output from the flip-flop FF1, at least one signal as stated above is impressed onto a holding circuit 9 through the circuit AN20 now opened, to make the holding circuit 9 conductive. Hence, the electric supply can not be interrupted, even if the switch S1 is opened. Since at least one signal as stated above is also being impressed onto an enable terminal CE of an one-shot circuit OS5 through an OR circuit OR14, an output of the circuit OS5 is rendered to be "HIGH" for a given time, with a signal being applied through an OR circuit OR 15 from the terminal POR. Subject to such output from the circuit OS5, an AND circuit AN22 is rendered to be conductive. Hence, an oscillation output of an oscillator OSC is input into the speaker SP through a switching circuit 7, thus resulting in an effectuation of the precursory warning signal prior to an effectuation of voiced warning. This precursory warning signal may be a simple acoustic signal sounding like "Pi . . . ". The acoustic signals continue during a time period for the output of the one-shot circuit OS5. However, in accordance with the negative edge of the output of the circuit OS5, a pulse generator PG11 is triggered and, a consequently generated pulse signal is impressed onto the acoustic signal generating circuit 2 as a start signal of the circuit 2. Successively, the four bits signal on at least one output line of the decoder 17, which carries thereon one specific warning statement, is input into the speaker through the switching circuit 7 and then, voiced a warning is given from the speaker. Soon after an effectuation of this voiced warning, an end signal is output from the circuit 2. The end signal causes a flip-flop FF7 to be reset and therefore, the holding circuit 9 is electrically cut off. Therefore, when the switch S1 has already been opened, due to, for example, a release of manual depression, the feeding operation to the entire circuit is ceased, in which a complete circuit operation is finished. However, if the switch S1 still remains closed at a moment when the holding circuit 9 is electrically cut off as stated above, the end signal stated above is adapted to be also impressed onto the circuit OS5 through the OR circuit OR15. However, when the photographic condition has not been corrected yet, and thus, the signal is on one of the output lines of the decoder 17, the one shot circuit OS5 is again triggered to repeat the same operation as described hereinabove.

When a condition to be warned does not exist, all the outputs of the output lines of the decoder 17 are zero. Accordingly, any signal to be applied upon the enable terminal of the one shot circuit OS5 through the OR circuit OR14 does not exist and, a signal to be sent to the holding circuit 9 (OR14→AN20→OR18→the holding circuit 9) also does not exist. Therefore, since the one shot circuit OS5 remains passive if the switch S1 is closed to supply the power upon the entire circuit, no voice is given from the speaker and the holding circuit 9 is not rendered conductive. Such being the case, the power supply condition is not retained, either, thus resulting in an inoperative state of the circuit.

The further description of the circuit construction of the present embodiment is given hereinbelow in connection with its functional characteristics under the flash photographic mode. In this embodiment, a flashing means of the autolight amount adjusting type is provided. After an effectuation of a photographic operation with a flashing light, the completion of the photographic operation is adapted to be voiced. The switch S1 is open prior to the shutter release or is adapted to be cooperative with the shutter releasing operation. Thus, the holding circuit 9 is cut off subsequent to the effectuation of the warning with its successive end signal. Such being the case, when the voiced announcement, subject to the accomplishment of the photographic operation with the flash light, is given, the circuit is electrically supplied by all means after the effectuation of the shutter release. The construction required for these purposes will be described hereinbelow. Upon completion of the operation for adjusting the light amount, a signal indicative of such a completion is impressed onto a terminal X, to make the holding circuit 9 conductive and then, the entire circuit is electrically fed. Subsequently, a one-shot circuit OS6 is triggered, and prior to a disappearance of the signal indicative of the completion of the light amount adjustment, a flip-flop FF8 is set in accordance with a negative edge of an output of the circuit OS6, to cause the holding circuit 9 to be retained conductive through a set-signal output from the flip-flop FF8. As will be described hereinafter with reference to FIG. 8, when the photographic operation is just brought about, no signal is output from the signal output circuit, with no signal being on the output lines of the decoder 17. Accordingly, no input is impressed onto the enable terminal CE of the one shot circuit OS5. Such being the case, even if the voltage is impressed onto the POR terminal, the circuit OS5 remains inoperative. In this case, no voiced warning is given from the speaker SP. The set-signal output from the flip-flop FF8 is also impressed onto a terminal h of the signal output circuit 16. However, as will be described in FIG. 8, the set-signal stated above is not output from the signal output circuit 16, while being output subsequent to an input of an exposure terminating signal to the circuit 16. When the exposure terminating signal is impressed onto a completion signal input terminal (see, the left, lower portion of FIG. 7), the exposure terminating signal is successively impressed onto a pulse generator PG10 through an AND circuit AN21. This is due to the fact that the circuit AN21 is rendered to be opened by means of the set-signal, which is output from the flip-flop FF8 and is impressed onto the circuit AN21 through an OR circuit OR17. In response to a negative edge of the exposure terminating signal, a pulse is generated with the pulse generator PG10 and then, is impressed onto the acoustic signal generating circuit 2 as the start signal. Successively, as a result, the circuit 2 outputs an acoustic signal indicative of completion of the light amount adjustment to the speaker SP. After this voiced warning is given, the end signal output from the circuit 2 is successively impressed onto the flip-flop FF8 through the OR circuit OR 15 as a reset signal, to reset the flip-flop FF8. Accordingly, the holding circuit 9 is rendered to be non-conductive.

In a flash photographic operation in the automatic light amount controlling mode, the exposure may be sometimes insufficient even in a case where the flashing means has been fully flashed, if the target to be photographed is located too far from the camera. This depends upon a correlation to be relatively effected between a set-aperture condition and the distance to the target. When the photographic operation is brought about under an appropriate flashing condition, an emission stop signal is adapted to be input into the flashing means soon after the proper exposure has been executed. Alternately, the emission stop signal can also serve for the light amount control signal. Specifically, if properly arranged, the circuit is adapted to voice an effectuation of the light amount control in response to the output of the emission stop signal. Accordingly, if the voiced statement is not given, the photographer can find that the photographic operation accompanied by the flashing has been done under an insufficient exposure condition.

Figure 8:
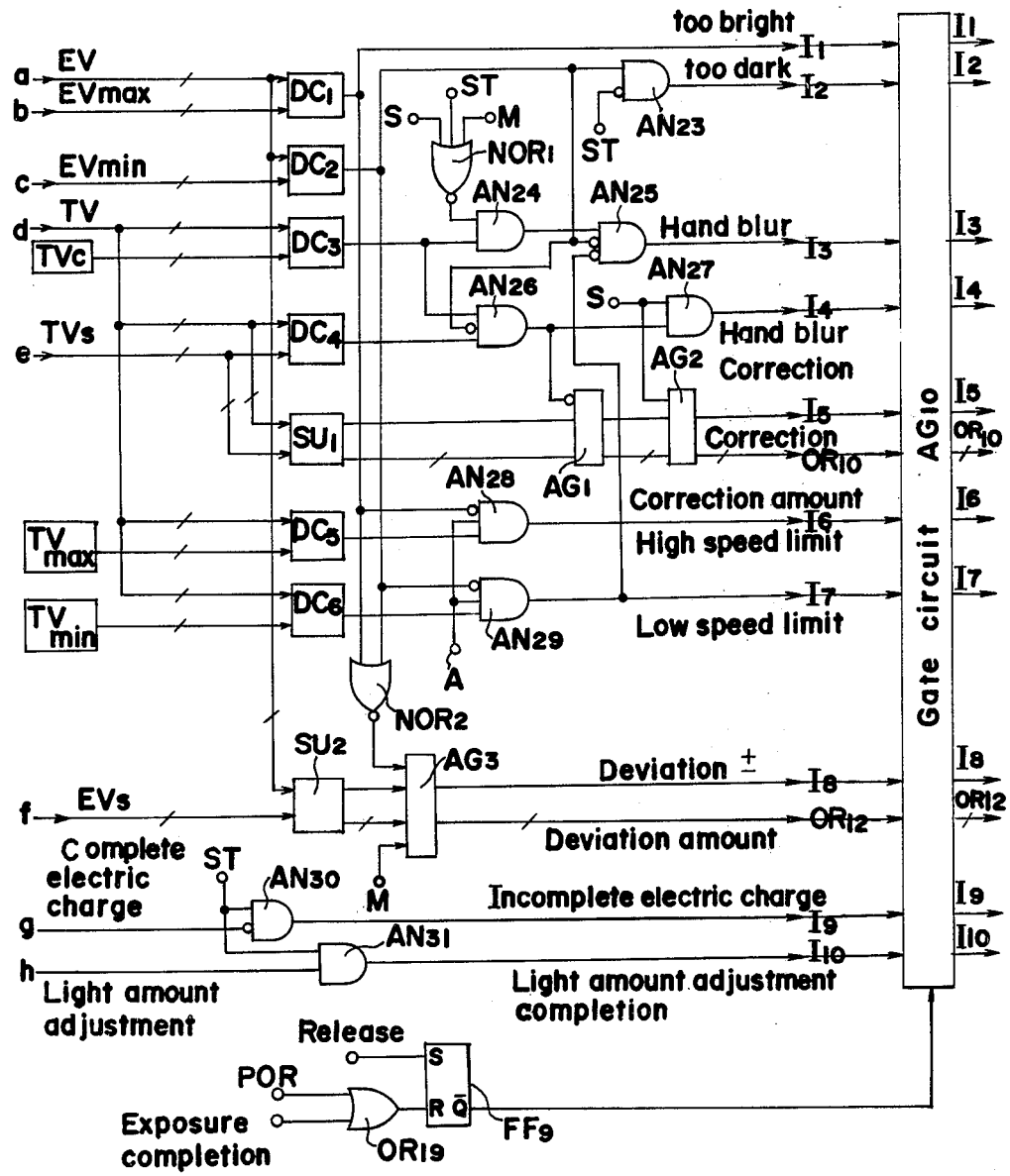
FIG. 8 illustrates a block diagram, showing a detailed construction of a signal output circuit constituting the embodiment shown in FIG. 7.

FIG. 8 illustrates a detailed construction of the signal output circuit 16 shown in FIG. 7. Respective terminals a to g and A, S, M, ST are connected to the operation circuit 15 as shown in FIG. 7. As described earlier, a symbol h designates a terminal, through which the set-signal output from the flip-flop FF8 is impressed, soon after the above-described light amount control operation is accomplished. Symbols I1 to I10 respectively designate output terminals, which are connected to corresponding input terminals I1 to I10 provided for the decoder 17. Symbols DC1 to DC6 designate respective digital type comparators, while SU1 and SU2 respectively designate subtraction circuits. The exposure value Ev, which is obtained through a calculation with respective values of the subject brightness and the film sensitivity, is impressed onto the terminal a. Through the terminal b, a total value Evmax of a possible shortest exposure time Tvmax and a smallest aperture Avmax are input. The digital comparator DC1 can compare the Ev value and the Evmax value and consequently, outputs a signal in a case where the Ev value is greater than the Evmax value. This signal means that the subject brightness exceeds an exposure control limit on the bright side (a too bright signal). Upon the terminal c, a sum Evmin of a possible longest exposure time Tvmin and an open aperture value Avo is impressed and consequently, a signal is output in a case where the Ev value is smaller than the Emin value. The consequent signal means the subject brightness is too low. The too bright signal is directly output to the output terminal I1, since such information is indispensable for all possible photographic modes. A too dark signal is adapted to be consequently impressed onto the output terminal I2 through an AND circuit AN23, which is adapted to be non-conductive in response to the input impression onto the input terminal ST. Since the ST terminal is adapted to be impressed by the signal in flash photographic operation mode, the too dark information is warned for all of the photographic modes except for the flash photographic operational mode, consequently. In the case of the flash photographic operation, the situation of "too dark" does not matter much, and a warning notifying the operator of the too dark condition is not necessary. Upon the terminal d, a consequent exposure time Tv, which is used for the actual control of the shutter speed, is impressed. The exposure time Tv and a limit exposure time Tvc for the hand blur occurring are compared with the digital comparator DC3, while the limit exposure time Tvc for the hand blur is stored in the circuit 16. When the value Tvc is greater than the value Tv, the signal indicative of the hand blur occurring is output from the digital comparator DC3, which is adapted to be impressed onto the terminal I3 through respective AND circuits AN24 and AN25. However, as can be seen from the drawing, the circuit AN24 is rendered to be non-conductive, when the operational mode is either one of the exposure time priority mode (S terminal input signal exists), the flash photographic operational mode (ST terminal input signal exists), and the manual operational mode (M terminal input signal exists). Also, the AND circuit AN25 is rendered to be non-conductive either in the case of the "too dark" or in the case of such a limit of low speed as will be described hereinbelow. The warning concerning the hand blur occurring is only required for respective operations of the aperture priority and the program priority modes. In the exposure time priority mode, the photographer may recognize such situation and often set a shutter speed, which is lower than the hand blur occurring limit, thus the hand blur condition being not particularly warned. Similarly, when the too dark warning is being given, it is of no use to give a warning of the hand blur. Thus, the warning signal of the hand blur occurring is impressed onto the terminal I3, only when a too dark condition does not exist either in the aperture-priority automatic exposure mode or in the programmed mode. Upon the terminal e, the exposure time Tvs, which has been set in the exposure time-priority mode, is impressed and further input into the digital comparator DC4. In addition to the exposure time signal Tvs, the digital comparator DC4 is impressed by such exposure time information Tv, which may be obtained through calculation on the basis of a limiting aperture condition, when either of excess or shortage in exposure still exists at its corresponding limiting aperture condition in the exposure time priority mode. The exposure time information signal Tv is input into the comparator DC4 through the terminal d and then, these values are compared. If a relationship of Tv≠Tvs exists, i.e. a setting shutter speed differs from a calculated shutter speed, a modified set-exposure time signal is adapted to be output. However, since this signal is only valid for the photographic operation with the exposure time priority mode, this signal is to be output from the terminal I4 only in a case where the terminal S is being impressed with the signal through an AND circuit AN27 (the terminal S is only impressed with the input-signal in the exposure priority mode). Further, in the "too dark" condition, since it is useless to correct the exposure time in accordance with its corresponding voiced warning, the AND circuit AN26 is adapted to be rendered non-conductive through the signal carrying thereon the "too dark" information. The AND circuit AN26 is adapted to be input with the hand blur signal, wherein the output to be impressed onto the terminal is required to be corrected is longer in exposure time. Such correction is needed in order to judge whether the hand blur is permissible or not. When the hand blur occurring is not brought about in accordance with the correction of the exposure time in the exposure time priority mode, a signal indicative of the correcting mode (direction) is impressed onto the output terminal I5 as well as the correction specified with a plural bit signal is impressed onto an OR circuit OR10 shown in FIG. 7. Namely, the subtraction between the above described Tv and TVs is performed at the subtraction circuit SU1. Positive or negative of the subtracting result and the absolute value thereof are impressed onto the terminal I5 and an OR circuit through a gate AG1 and a gate AG2. The gate AG1 is rendered to be opened, subject to the non-hand blur occurring condition, while the gate AG2 is rendered to be opened if in the exposure time priority automatic exposure mode. The digital comparator DC5 compares the Tv value output from the above stated terminal d with the highest possible shutter speed value Tvmax, wherein when a relationship of Tv>Tvmax exists, a high-speed limit signal is output. Also a digital comparator DC6 is adapted to compare the Tv value with the longest exposure time Tvmin, in which when a relationship of Tvmin>Tv is compatible, a low-speed limit signal is output. The respective high-speed limit signal and low-speed limit signal are impressed onto respective terminals I6 and I7 through respective AND circuits AND28 and AND29, wherein these circuits AND28 and AND29 are adapted to be opened in the aperture priority automatic exposure mode, i.e., when an input is being impressed onto the terminal A. Further, through a terminal f, the sum Evs of the setting aperture value Avs and the exposure time Tvs are input. Respective Evs value and the exposure value Ev obtained from the subject brightness value are adapted to be impressed onto subtraction circuit SU2. The absolute value of the difference between the Evs and the Ev together with its positive or its negative are both output into the output terminal I8 and an OR circuit OR12 (see FIG. 7) through a gate AG3. The gate AG3 is adapted to be opened when an input is impressed onto the terminal M in the manual mode, with the condition being of neither "too bright" nor of "too dark". The gate AG3 can indicate "which side" and "how many" stages the aperture and shutter speed, both being set in advance in the manual mode, are deviated from the proper exposure. The charge completion signal concerning a main capacitor of the flashing means is adapted to be impressed onto the terminal g. When the charging is not completed yet in the flash photographic mode, the charging incompletion signal is output to the terminal I9 through an AND circuit AN30. As described in FIG. 7, the set signal output from the flip-flop FF8, which is set in response to completion of the light amount adjustment operation, is impressed on the terminal h and then, is output from the terminal I10 through an AND circuit 31, which is adapted to be opened in the flash photographic mode. The flip-flop FF9 is reset through the power supply operation (an input is impressed onto the POR terminal) and, is set by the shutter release, while it is again reset through an exposure completion signal, which is impressed onto the flip-flop FF9 through the OR circuit OR10. Accordingly, a gate AN10 is rendered to be opened by Q signal output from the flip-flop FF9, thus a plurality of signals output from the terminals I1 to I10 being successively input into the decoder 17. Further, the data of the correction amount and the deviation amount (the offset amount) are adapted to be delivered. No warnings are adapted to be brought about during the exposure controlling period.

The decoder 17 shown in FIG. 7 converts the signals from the above-stated signal output circuit 16 and the OR circuit OR10, OR circuit OR12 into four bit information signals, to apply them upon the acoustic signal generating circuit 2. The following table shows the input and output relationship between the terminals I1 to I12 and 01 to 04, respectively.

correction is negative. In both +stage deviation and −stage deviation of the manual mode, the positive can exist if the input of the terminal I8 is of "1", while the negative can exist if the input of the terminal is of "0". Correcting values are adapted to be impressed upon the terminal I12 of the decoder 17 through the OR circuit OR12, thus further indicating that the set aperture and shutter speed both deviate from the proper exposure. For the sake of brevity of the description, there is shown only one circuit OR13 in FIG. 7. However, as a matter of fact, the number of the OR circuits is adapted to fit the number of the bits of the input data.

Figure 9:
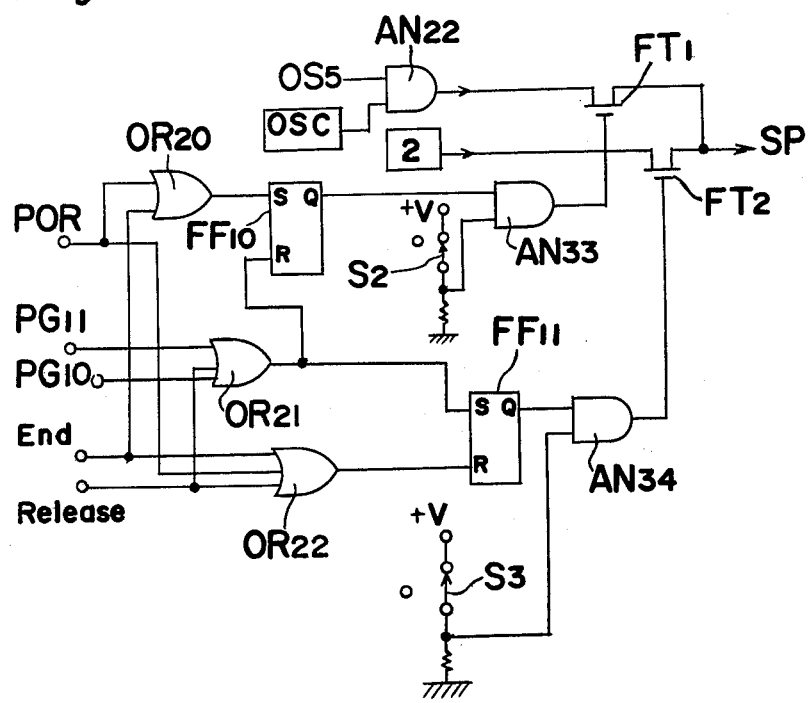
FIG. 9 illustrates a block diagram, showing a detailed construction of a switching circuit constituting the embodiment shown in FIG. 7.

FIG. 9 illustrates a detailed construction of the switching circuit 7 shown in FIG. 7, which is adapted to be changed over, either to give the output from the oscillator OSC to the speaker SP, or to give the output from the acoustic signal generating circuit 2 to the speaker SP. When the switch S1 is closed, thereby to effect the electric supply, the pulse is input from the terminal POR. Accordingly, the set signal input terminal of the flip-flop FF10 is impressed by a signal through an OR circuit OR20, to render it to be set. Successively, the set signal output from the flip-flop FF10 is impressed onto the switch circuit FT1 of the switch FET through an AND circuit AN33, thus causing the FT1 of the switch FET to be rendered conductive and thereafter, the output from the oscillator OSC is fed to the speaker through the AND circuit AN22. The switch S2 is adapted to be opened, when the precursory warning sound is not desired to be brought about. When the switch S2 is opened, the circuit AN33 is rendered non-conductive. Accordingly, such being the case, even if the flip-flop FF10 is set, the switch circuit FT1 remains non-conductive, thus resulting in no precursory warning sound. A pulse which is output from a pulse generator PG11 in accordance with the negative edge of the output of the one shot circuit OS5

TABLE

| Information | decoder input |  |  |  |  |  |  |  |  |  |  |  | decoder output |  |  |  |
|---|---|---|---|---|---|---|---|---|---|---|---|---|---|---|---|---|
|  | I1 | I2 | I3 | I4 | I5 | I6 | I7 | I8 | I9 | I10 | I11 | I12 | 01 | 02 | 03 | 04 |
| Too bright | 1 | 0 | 0 | 0 | 0 | 0 | 0 | 0 | 0 | 0 | 0 | 0 | 0 | 0 | 0 | 1 |
| Too dark | 0 | 1 | 0 | 0 | 0 | 0 | 0 | 0 | 0 | 0 | 0 | 0 | 0 | 0 | 1 | 0 |
| Hand blur occurring | 0 | 0 | 1 | 0 | 0 | 0 | 0 | 0 | 0 | 0 | 0 | 0 | 0 | 0 | 1 | 1 |
| Hand blur occurring & Correction | 0 | 0 | 0 | 1 | 0 | 0 | 0 | 0 | 0 | 0 | 0 | 0 | 0 | 1 | 0 | 0 |
| +n stage correction | 0 | 0 | 0 | 0 | 1 | 0 | 0 | 0 | 0 | 0 | 1 | 0 | 0 | 1 | 0 | 1 |
| −n stage correction | 0 | 0 | 0 | 0 | 0 | 0 | 0 | 0 | 0 | 0 | 1 | 0 | 0 | 1 | 1 | 0 |
| High speed limit | 0 | 0 | 0 | 0 | 0 | 1 | 0 | 0 | 0 | 0 | 0 | 0 | 0 | 1 | 1 | 1 |
| Low speed limit | 0 | 0 | 0 | 0 | 0 | 0 | 1 | 0 | 0 | 0 | 0 | 0 | 1 | 0 | 0 | 0 |
| +n stage deviation | 0 | 0 | 0 | 0 | 0 | 0 | 0 | 1 | 0 | 0 | 0 | 1 | 1 | 0 | 0 | 1 |
| −n stage deviation | 0 | 0 | 0 | 0 | 0 | 0 | 0 | 0 | 0 | 0 | 0 | 1 | 1 | 0 | 1 | 0 |
| Incomplete charging | 0 | 0 | 0 | 0 | 0 | 0 | 0 | 0 | 1 | 0 | 0 | 0 | 1 | 0 | 1 | 1 |
| light amount adjusted | 0 | 0 | 0 | 0 | 0 | 0 | 0 | 0 | 0 | 1 | 0 | 0 | 1 | 1 | 0 | 0 |

In the +n stage correction, the value of "1" indicates that the correction is positive in the aperture priority automatic exposure mode. On the contrary, the value of "0" indicates that the correction is negative. Numeral value signal of n stage is referenced to as that which is input into the input terminal I11 of the decoder 17 through the OR circuit OR10 and, which requires corrections. The I5 terminal input of "0" indicates that the shown in FIG. 7 is adapted to be impressed onto the flip-flop FF10 through an OR circuit OR21, to reset the flip-flop FF10 and thereafter, to render the switch circuit FT1 non-conductive. Further, the output of the circuit OR21 sets the flip-flop FF11. The set output of the FF11 is applied upon the switch circuit FT2 through an AND circuit AN34, to render the switch circuit FT2 conductive, thereby to transmit the output of the acoustic signal generating circuit 2 to the speaker SP. Thus, the voiced warning is brought about. The end signal from the acoustic signal generating circuit 2 or the shutter release signal is successively applied, through the OR circuit OR22, upon the flip-flop FF11 to reset it. A switch S3 is a specific switch, which is adapted to be opened when the voiced warning is not desired to be given. When the switch S3 is opened, the circuit AN34 is rendered to be non-conductive and further, the switch circuit FT2 is rendered to be non-conductive, thus resulting in no voiced warnings, accordingly.

Figure 10:
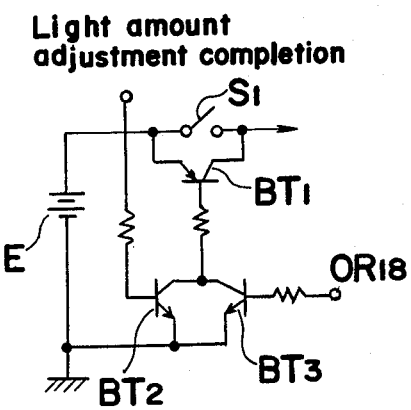
FIG. 10 illustrates a block diagram, showing a detailed construction of a holding circuit constituting the embodiment shown in FIG. 7.

FIG. 10 illustrates a detailed construction of the holding circuit 9 shown in FIG. 7. A symbol E designates a power supply source. A signal from the OR circuit OR 18 in FIG. 7 renders a transistor BT3 conductive. Accordingly, a base current flows to a transistor BT1 parallelly connected to the switch S3, to render the transistor BT1 conductive, whereby the power supply is retained. When the light amount adjustment is performed, the completion signal is impressed onto and renders the transistor BT2 conductive. Hence, the transistor BT1 is rendered to be conductive in the same manner as described hereinabove. The light amount adjustment completion signal is of a short period. However, since the signal is to transmit through the OR circuit OR18 during the existence of the above-described completion signal, the power supply is retained, consequently.

Figure 11:
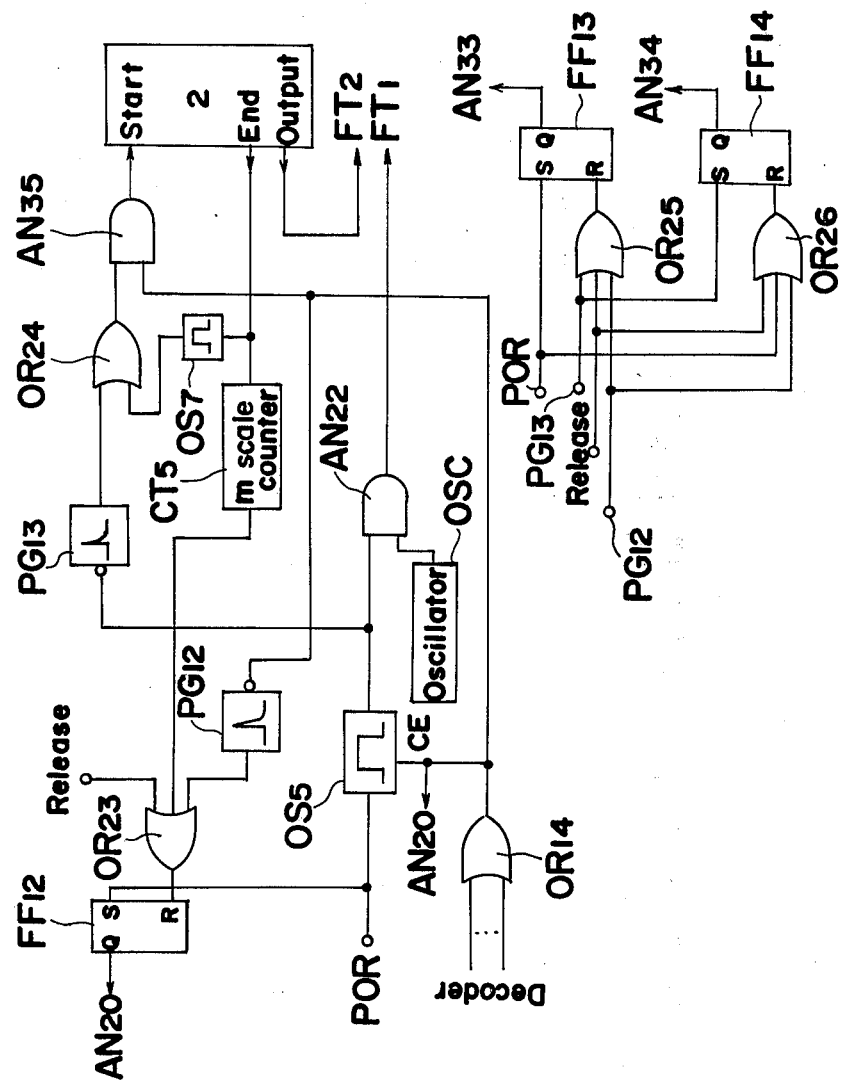
FIG. 11 is a view similar to FIG. 1, particularly showing a further modified embodiment shown in FIG. 7.

FIG. 11 illustrates a sixth embodiment of the present invention, particularly showing respective constituents different from those shown in FIG. 7. Upon closure of a power supply switch S1, respective flip-flops FF13 and FF12 are set, while a flip-flop 14 is adapted to be reset. Such being the case, when an output from an OR circuit OR14 is "HIGH", the signal of "HIGH" is output from a one shot circuit OS5 for a given period, to output the warning sound such as "Pii . . . ". In response to a negative edge of the output from the one shot circuit OS5, a pulse is output from a pulse generator PG13 and is impressed onto an acoustic signal generating circuit 2 as the start signal. Further, when the flip-flop FF13 is reset, with the flip-flop FF14 being set, a signal output from the acoustic signal generating circuit 2 is imparted to a speaker SP. Soon after an end signal is output from the acoustic signal generating circuit 2, the signal is impressed onto a m-scale counter CT5. Also, the end signal is impressed onto a one shot circuit OS7 to cause it to be a start signal. When the same voiced signal is output for m times, the flip-flop FF12 is reset, to render a holding circuit 9 inoperable. Furthermore, when the output from the OR circuit OR14 is rendered to be "LOW", with either the voiced signal or the warning signal being output on the other hand, the flip-flops FF12, FF13, and FF14 are all reset, thus resulting in non-occurrence of the voiced signals.

Figure 12:
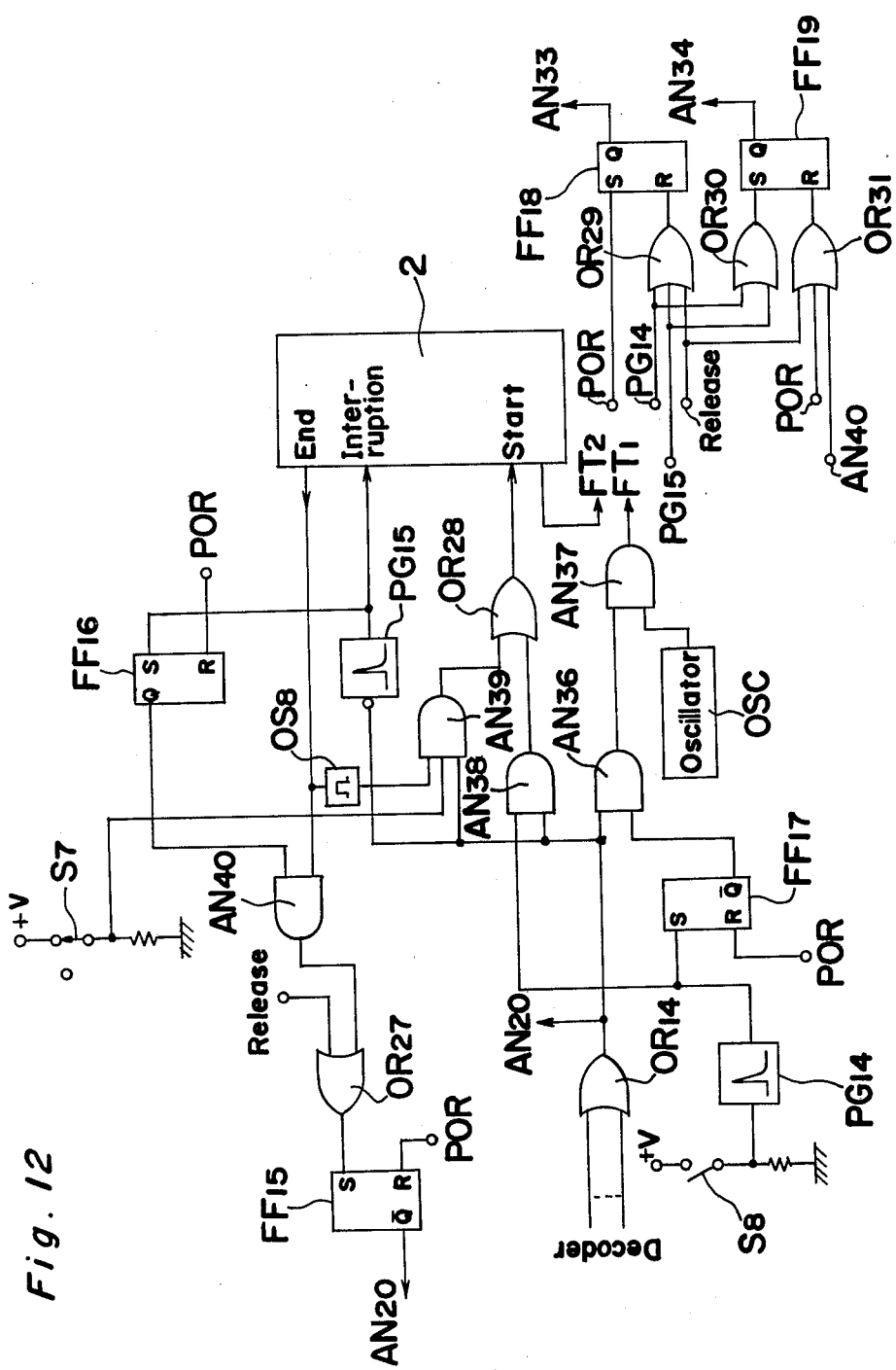
FIG. 12 is a view similar to FIG. 1, particularly showing a further modified embodiment of FIG. 1.

Referring now to FIG. 12, there is shown a seventh embodiment in accordance with the present invention. Soon after electric power is supplied, all of the flip-flops FF16, FF15 and FF19 are rendered to be reset, while a flip-flop FF18 is rendered to be set. Such being the case, when an output of the OR circuit OR14 is of "HIGH", an output from the AND circuit AN36 is rendered to be "HIGH". Further, a signal from an oscillator OSC is output from an "AND" circuit AN37. According to this signal, warning signals such as "Pii . . . " are output from the speaker SP. When a photographer closes a switch S8, a pulse is output from a pulse generator PG14, to set flip-flops FF17, FF19 and, to reset the flip-flop FF18. Such being the case, a signal from the oscillator OSC is no longer output from an AND circuit 37, while the signal from the acoustic signal generating circuit 2 is impressed onto the speaker SP. Successively, a signal from a pulse generator PG14 is input as a start signal through an AND circuit AN38 and an OR circuit OR28. Once the end signal is output, a one shot circuit OS8 is rendered to be operative, and a start signal is input through an AND circuit AN39 and an OR circuit OR28, respectively. Therefore, as long as the output from the OR circuit OR14 is of "HIGH", the same voiced signals are repeatedly given. To stop such voiced signals a switch S7 is to be opened. Alternately, when the switch S7 is left opened from the beginning, the voiced signal is output only once. Further, instead of such provision of the switch S7, the present embodiment can be modified in a manner such that the gate of the AND circuit AN39 is arranged to be closed, soon after counting of the end pulse with a m-scale counter, with the same type signals being correspondingly output for m times, is executed. When the output of the OR circuit OR14 becomes "LOW", with the warning sounds or the warning voices being output, a pulse is output from a pulse generator PG15. Such being the case, in response to the generation of the pulse, the flip-flops FF16 and FF19 are set, and successively, the flip-flop FF18 is reset, thus a gate of an AND circuit AN40 is opened. While the precursory warning sounds are being output, the switching operation is performed, so that the signal from the voiced signal output from the acoustic signal generating circuit 2 may be imparted to the speaker SP. Further, this signal is input into an interruption terminal of the acoustic signal generating circuit 2 and thereafter, the voiced signal indicating that the photographic operation is properly performed is arranged to be output and is acoustically displayed. Upon completion of the output of this signal, the end pulse is output and then, is input to the flip-flop FF15 through the AND circuit AN40 and the OR circuit OR27. Accordingly, the flip-flop FF15 is set, to render the holding circuit 9 inoperable. In addition, the pulse from the AND circuit AN40 is input even to the reset terminal of the flip-flop FF19 through an OR circuit OR31. Consequently, since the flip-flop FF19 is reset, the signals are no longer input into the speaker SP.

Figure 13:
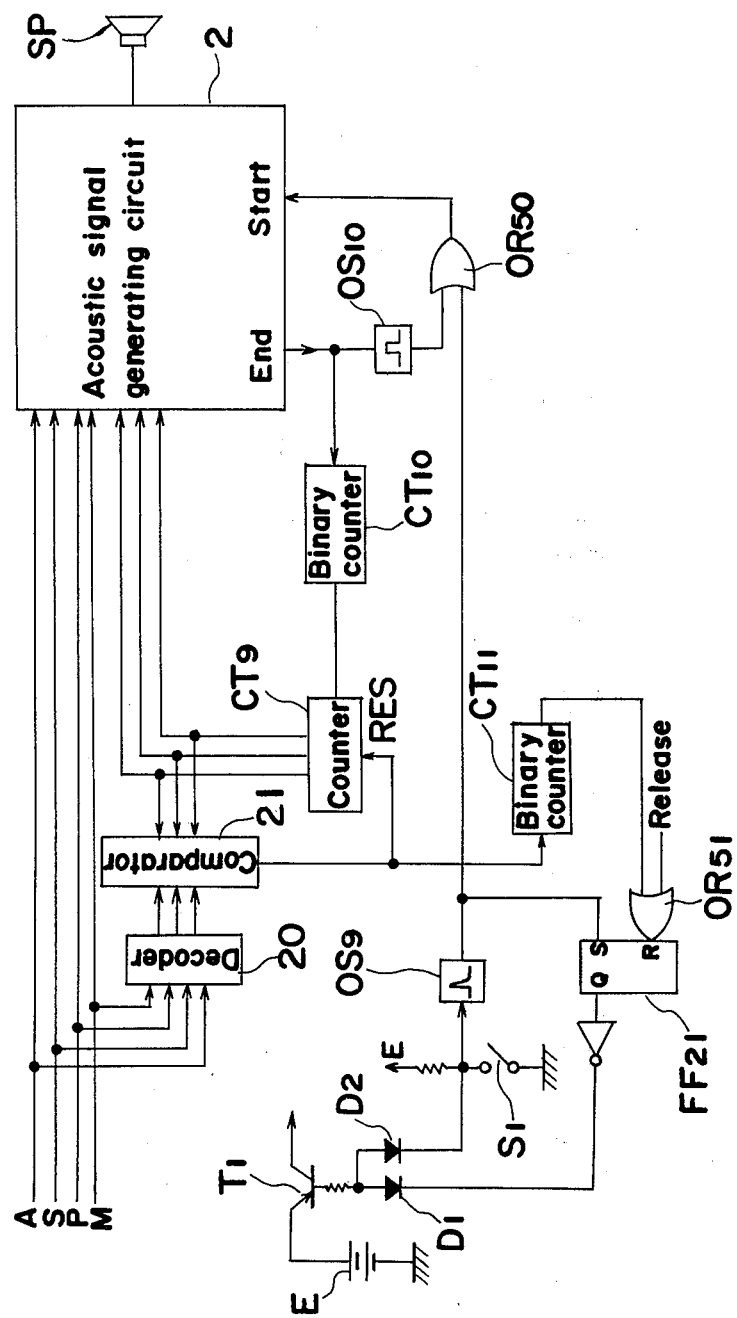
FIG. 13 is a view similar to FIG. 1, particularly showing a still further modified embodiment of FIG. 1.

FIG. 13 illustrates an eighth embodiment of the present invention. A signal corresponding to a photographic operational mode selected in advance is adapted to be impressed onto either one of terminals A, S, P and M, which are shown in the left-hand side and upper portion of FIG. 13. More specifically, when an aperture priority automatic exposure mode is selected (hereinafter referred to as A mode), the signal is applied upon the terminal A. When an exposure time priority mode is selected (hereinafter referred to as S mode), the signal is applied upon the terminal S. Similarly, when a program shutter mode is selected (hereinafter referred to as P mode), the signal is applied upon the terminal P. The signal is applied upon the terminal M, when the mode selected in advance is a manual mode (hereinafter referred to as M mode). Numeral 2 designates an acoustic signal generating circuit, which synthesizes acoustic signals corresponding to the selected mode in response to the signal selectively impressed through either one of the terminals A, S, P and M, and then, outputs them into the speaker, to announce to a photographer a camera operation manner. Narration or announcement includes several statements for one photographic operation mode selected. Namely, several descriptions are adapted to be given sequentially. For example, in the A mode, five statements are included. Further, according to this embodiment, an end signal is adapted to be output, at each end of one voiced statement, from the acoustic signal generating circuit 2. The end signals are adapted to be counted with a counter CT9, the detail of which will be described hereinbelow. For example, in the A mode, a comparator 21 first receives an input by a signal of numeral specifying 5 and then, this numeral is compared with a number counted up with the counter CT9, in which when both of these numbers coincide with each other, the entire description of the operation, i.e. an entire function of the arrangement, is to be over. Contents of the operational description of the camera to be given will be as follows.

(1) A mode
  1. Statement for telling that the selected mode is A.
  2. Set an ASA (film sensitivity).
  3. Set an aperture size.
  4. Focus a target.
  5. Photographic preparation is completed.

(2) S mode
  1. Statement for telling that the selected mode is S.
  2. Set an ASA.
  3. Set an exposure time.
  4. Focus a target.
  5. Photographic preparation is completed.

(3) P mode
  1. Statement for telling that the selected mode is P.
  2. Set an ASA.
  3. Focus a target.
  4. Photographic preparation is completed.

(4) M mode
  1. Statement for telling that the selected mode is M.
  2. Set an ASA.
  3. Set an exposure time.
  4. Set an aperture size.
  5. Focus a target.
  6. Photographic preparation is completed.

As described hereinabove, the operational explaining content for each mode is composed of five voiced sentences in the A mode as well as in the S mode, while four voiced sentences are included in the P mode. Further, in the M mode, six voiced sentences are included therein. The decoder 20 is adapted to output a binary signal corresponding to a numeral 5, when a signal is applied either upon the terminal A (A mode), or the terminal S (S mode). The above-stated binary signal is successively impressed onto the comparator 21. On the other hand, when a signal is applied upon the terminal P (P mode), the decoder 20 is adapted to output a binary signal corresponding to a numeral 4, which is further impressed onto the comparator 21. Similarly, when the M mode is set, a binary digit signal corresponding to numeral 6 is applied upon the comparator 21.

By such arrangement as stated above, when a photographer wants to receive the announcements of camera operating method, the switch S1 is required to be first closed. The switch S1 may be closed at a first stage of the depression of a shutter release button or may be operated by another button provided independently from the shutter release button. Upon closure of the switch S1, a base current flows to a transistor T1 through a diode D2, thus the transistor T1 being rendered to be conductive. Accordingly, the voltage potential of the power supply source E is applied upon the entire circuit shown in FIG. 13, to allow the circuit to be electrically fed. When the switch S1 is closed, a one shot circuit OS9 is triggered, to output one pulse. This pulse is further impressed onto the flip-flop FF21, thus the flip-flop FF21 being set. A set signal output from the flip-flop FF21 is inverted and thereafter, is impressed onto a cathode of a diode D1. Accordingly, the diode D1 is rendered to be conductive. Such being the case, even if the switch S1 is opened hereinafter, the power supply for the entire circuit remains unchanged, due to the fact that the transistor T1 remains conductive. The output pulse from the one shot circuit OS9 is impressed onto the acoustic signal generating circuit 2 through the OR circuit OR50 as the start signal. Upon impression of the start signal, the acoustic signal generating circuit 2 starts operation, in which the circuit 2 imparts a topmost arrayed acoustic signal of the specific content to the speaker SP, while the specific content per se has been chosen among the various photographic modes (i.e. the specific photographic mode is impressed onto the corresponding one of the terminals A, S, P, and M). Namely, first of all, the name of the mode is acoustically voiced from the speaker SP. Soon after the above-stated announcement is effected, an end pulse is output from the circuit 2. The binary counter CT9 is to count up by one in accordance with the input of the pulse stated above. Further, since the pulse is applied upon the one shot circuit OS10, the circuit OS10 is then triggered. An output pulse from one shot circuit OS10 is again impressed onto the acoustic signal generating circuit 2 as the start signal and thus, the circuit 2 repeats the same announcement. According to this circuit 2, to advance the content from the first to the second, the operation will be performed as follows. As the counter CT9 has been initially reset, the counted-up digit output is rendered to be zero. Furthermore, the counted-up digit output is impressed onto the acoustic signal generating circuit 2 at the same time. Such being the case, when the counted-up digit output of the counter CT16 is zero in the circuit 2, the topmost arrayed explanation is given in every mode. Successively, when the counted-up digit output of the counter CT9 becomes 1, the second arrayed statement for the second operational explanation is given. In the same manner as described hereinabove, the explaining announcement of the camera operation is adapted to be followed. The counter CT9 is adapted to receive a second digit signal (output rise of a digit 0) output from the binary counter CT10 as the second end signal and then, to count it up. The counter CT10 is of the binary type. Accordingly, the counting of the counter CT9 advances by one for each second end pulse. Thus, the same operational announcement is repeated twice and the operation can proceed. When the announcement of the completion of the photographic preparation as the last statement is repeated twice in the same manner as described above, the counted-up digit number of the counter CT9 becomes 5 in the A mode and in the S mode. On the other hand, the counted-up digit number of the counter CT9 becomes 4 in the P mode, while it becomes 6 in the M mode. The digital output from the counter CT9 is compared with the output from the decoder 20 with the comparator 21. As stated above, an output from the decoder 20 is a corresponding numeral 5 in the A and in the S mode, while an output from the decoder 20 is a corresponding numeral 4 in the P mode. Further, an output from the decoder 20 is a corresponding numeral 6 in the manual mode. When the counted-up signal output from the counter CT9 coincides with the output from the decoder 20, the comparator 21 outputs a coincidence signal, to reset the counter CT9. Further, the coincidence signal stated above is counted with a binary counter CT11. Soon after the completion of the series of the statements constituting one operational content of the camera, the counter CT9 is rendered to be reset, with the digit output again rendered to be zero. Thus, the above-described operation is repeated in the same manner. Each stage of the same explanation (statement) is repeated twice. The coincidence signal, which is output again from the comparator 21 when the last statement is completed twice, resets the counter CT9. Further, the digit signal of the binary counter CT10 returns to zero and the rise type signal of the zero digit signal is impressed onto the flip-flop FF21 through an OR circuit OR51, to render the flip-flop FF21 reset. If the switch S1 is kept open at this time, the transistor T1 is rendered to be non-conductive due to an effectuation of the non-conductive condition of the diode D1, thus resulting in a stop of the electric power supply to the entire circuit. As a result, the operation of the circuit shown in FIG. 13 is brought to an end and then, stopped. Even at any stage of an explaining announcement, once the shutter release is performed, the release signal is applied upon the flip-flop FF21 through the OR circuit OR51, to reset the flip-flop FF21. Such being the case, the operation of the entire circuit shown in FIG. 13 is brought to an end, to stop the announcement of the operation stated above.

Figure 14:
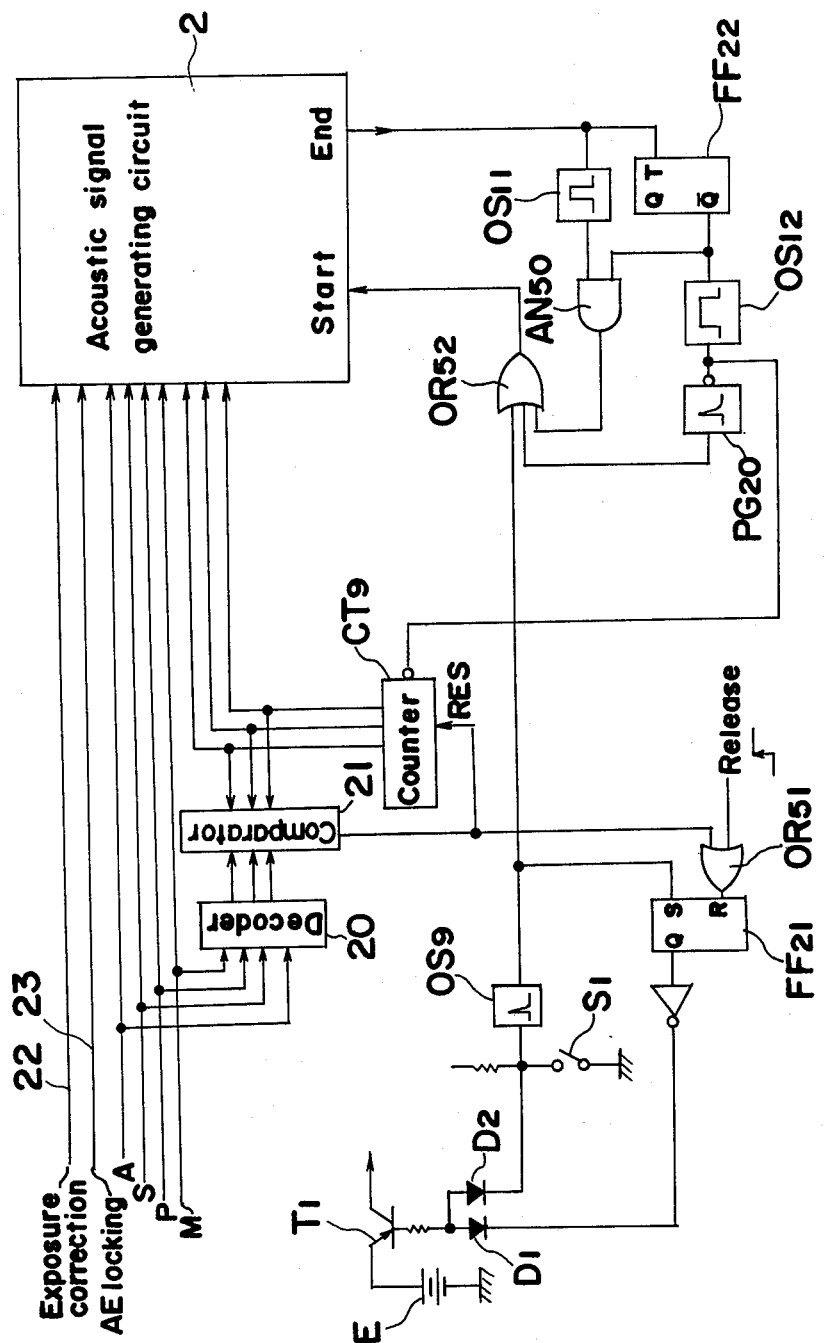
FIG. 14 is a view similar to FIG. 1, particularly showing a further modified embodiment of FIG. 1.

FIG. 14 illustrates a ninth embodiment of the present invention. This embodiment is different from that shown in FIG. 13, such that the announcement is given twice at each stage, with a short time interval being especially provided between the stages, thereby to ensure the announcement is precisely understood. Further, when the override exposure or the AE (automatic exposure) lock are being effected, such announcement that these operating steps are being in operation, is adapted to be acoustically given in the first announcement of the selected mode. The description of the corresponding constituents shown in FIG. 13 is omitted here. The characteristic construction of this embodiment will be detailed. When the switch S1 is closed, the electric power is applied upon the entire circuit, thus a power supply being retained. Also, in response to a pulse signal output from a one shot circuit OS9, an acoustic signal generating circuit 2 starts operation, thus resulting in the first staged announcement of the selected mode. After this announcement, an end pulse is output from the circuit 2 and thereafter, a one shot circuit OS11 is triggered by the end pulse. Also, the output of a T-flip-flop FF22 is inerted and a Q output becomes "HIGH", to open an AND circuit AN50. Thus, the output pulse of a circuit OS11 is impressed upon the acoustic signal generating circuit 2 as the start signal through both of a circuit AN50 and an OR circuit OR52, so that the same announcement as stated above can be repeated. Since the end pulse to be output from the circuit 2 at the end of the second announcement reverses the T-flip-flop FF22 again, the Q output of the T-flip-flop FF22 becomes "LOW", thus resulting in the close of a circuit AN50. As a result, the output pulse of the OS11 can not reach the circuit 2 and thus, the acoustic signal generating circuit 2 does not announce the second stage of the camera operation immediately. On the other hand, when the Q output falls to "LOW" due to the re-reversion of the T-flip-flop FF22, a one-shot circuit OS12 is triggered in accordance with the negative edge as stated above and a pulse with a proper time width is output, accordingly. The negative edge of the output pulse is counted with the counter CT9 and then, a counted output (digit 1) of the counter CT9 is impressed onto the acoustic signal generating circuit 2, wherein the second stage of the camera operation is selected. On the other hand, in response to the negative edge of the output pulse of the one shot circuit OS12, a pulse generator PG20 is triggered. The output of the pulse generator PG20 is impressed onto the circuit 2 through the OR circuit OR52 as the start pulse thereto, whereby the circuit 2 outputs the second staged signal of the camera operation. Similarly, even in the announcement of this type, the announcement is performed twice in the same manner as described hereinabove and thereafter, the one shot circuit OS12 is triggered. In the same manner, each stage of the camera operation is announced twice. Further, between the stages, there is provided a time interval, which corresponds to a time width of the output pulse of the one shot circuit OS12. The construction and operation, in which the retention of the power supply is released when each stage of the camera operating explanation has been announced twice and the entire description has been completed, are the same as in the embodiment of FIG. 13. On a signal line 22, a signal indicative of the override exposure being in operation is impressed, while on a signal line 23, a signal indicative of the AE lock being in operation is impressed. When the signals are applied upon these signal lines, such announcement that the override exposure or the AE lock are being in operation is adapted to be given in the first announcement for every selected mode as described earlier. For the purposes stated above, in a microcomputer incorporated in the acoustic signal generating circuit 2, a subroutine of ROM area selection type is required to be further added to a microcomputer incorporated in the embodiment shown in FIG. 13. According to such subroutine, when the counting number of the counter CT9 is zero, respective presence and absence of such operational steps as stated above are first judged and thereafter, depending upon the signal condition, such signal indicative of the override exposure or signal indicative of the AE lock are adapted to be output prior to the output of signal indicative of the selected mode.

Figure 15:
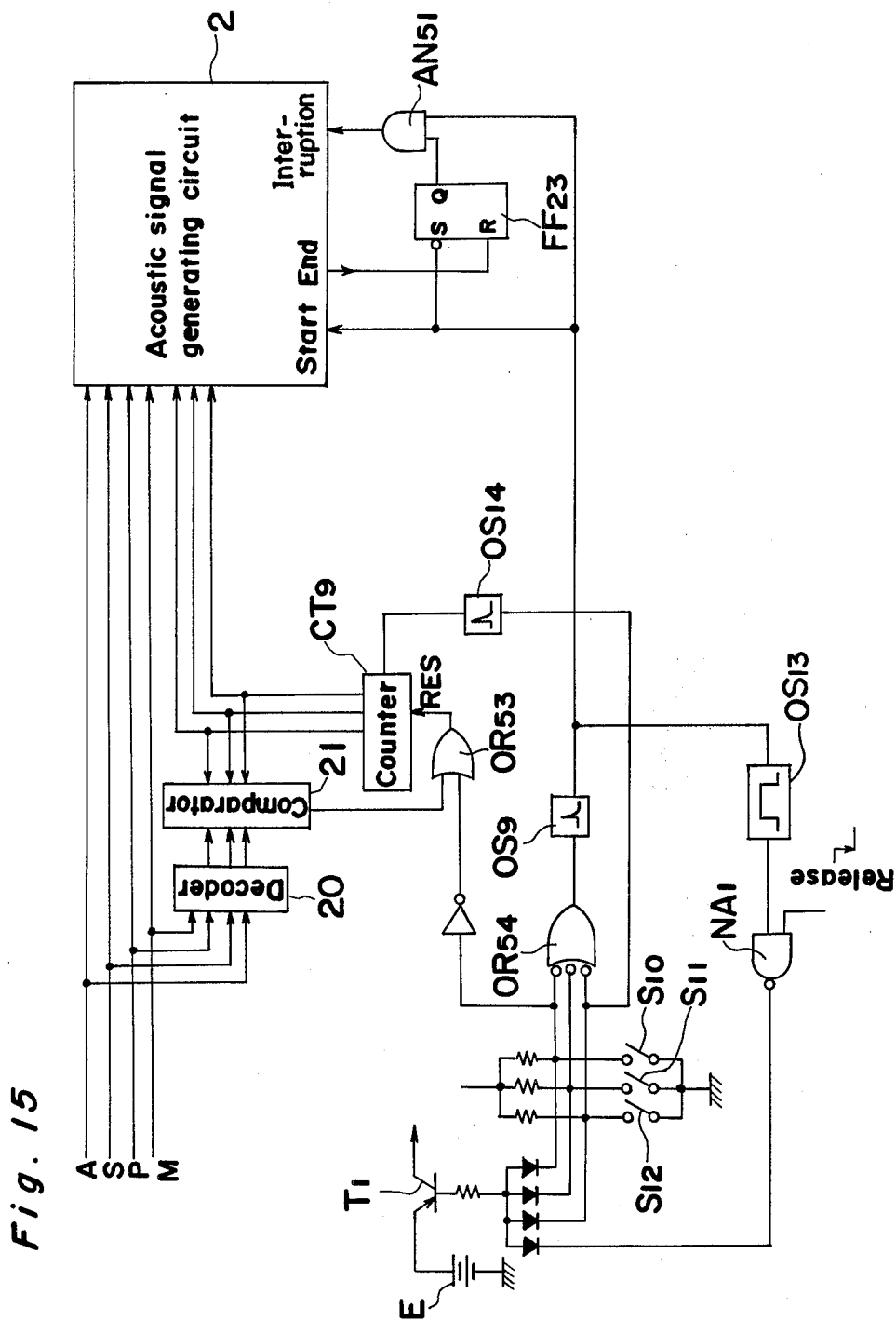
FIG. 15 is a view similar to FIG. 1, particularly showing a still further modified embodiment of FIG. 1, which is characterized in that alternate selection among repetition of a same stage of announcement, an advancing operation for a following stage, etc. can be made by a switching actuation at each stage of the announcement of the camera.

FIG. 15 illustrates a tenth embodiment of the present invention. This arrangement is especially characterized in that alternate selection among a repetition of the same stage of announcement, an advancement for the following stage, etc, can be performed by a switching actuation at each stage of the announcement of the camera. For the purposes, the tenth embodiment is different from respective embodiments shown in FIGS. 13 and 14 with respect to the construction of a starting switch S1. The starting switch S1 is composed of the three type switches S10, S11 and S12. Like parts are designated by like reference numerals throughout the drawings showing respective embodiments of FIGS. 13 and 14, and only the portions that are different from the portions of the above described embodiments will be described. The switch S10 is a type adapted to permit a first stage announcement (such notice of the mode name as described in the above-described several embodiments) to be given in the selected operational mode. Every time this switch S10 is depressed, a first stage announcement will be made. The switch S11 is a type adapted to repeat the same statement, whenever it is closed. The switch S12 is a type adapted to advance the following announcement by one step or stage, every time the switch S12 is depressed. In the present embodiment, the operation announcement is not automatically advanced. The advance is made one stage by one stage every time the switch S12 is closed. When the switch S10 is closed, a counter CT9 is reset through an OR circuit OR53. Thus, the counted digit signal output from the counter CT9 is exactly impressed onto the acoustic signal generating circuit 2, so that the first stage of the operational explanation is announced. Upon closure of the switch S10, a pulse from a one shot circuit OS9 is output, to apply a start signal upon the circuit 2. Further, the pulse stated above simultaneously triggers a one shot circuit OS13. The width of the pulse from the one shot circuit OS13 corresponds to the time period of approximately ten seconds. During generation of the pulse, a transistor T1 is rendered to be conductive, to retain a power supply. Further, as is clear from the drawing, the embodiment can only give an announcement once, since any electric circuits, through which an end pulse output from the circuit 2 subsequent to completion of the first stage announcement is fed back thereto as the start signal, do not exist. Thus, the retention of the power supply is released after ten seconds from the start. Further, due to the same reason as stated above, since the end pulse is not impressed onto the counter CT9, the operating announcement can not automatically advance to the next stage. Upon further closing actuation of the switch S10, the above-described operation is again repeated. The same operation is performed once every time the switch S10 is depressed. In order to advance the announcing stages, the switch S12 is adapted to be closed. Even in this case, the operation to retain the electric power supply for approximately ten seconds is the same as described in connection with the description concerning the closure of the switch S10. When the switch S12 is closed, a one shot circuit OS14 is triggered, to advance the counting of the counter CT9 by one and the one shot circuit OS9 is triggered to apply the start signal upon the circuit 2, thus resulting in an effectuation of the following announcement for one time only. In order to continuously advance the operational explaining, the switch S12 is correspondingly closed for every time. When the specific announcement is required to be given once more, the switch S11 is adapted to be closed. Such being the case, neither the counter CT9 is rendered to be reset, nor the one shot circuit OS14 is triggered. Accordingly, the counted digit output remains unchanged and thus, the same explaining stage is repeated. When the switch S10 is closed at an optional stage, the counter CT9 is reset. Accordingly, whenever the switch S10 is closed, the first stage announcement is correspondingly brought about. The end pulse output from the circuit 2 renders a flip-flop FF23 reset. Since the flip-flop FF23 is set by a start signal, a set-output is "HIGH" in level only during the announcing operation. During this period, an AND circuit AN51 is being opened. When one of the switches S10, S11, and S12 is closed during this announcing period, an interruption signal is applied upon the circuit 2 through a circuit AN51. By way of example, when the switch S10 is closed by the above-stated signal, the announcement which is being performed is interrupted, to make the first stage announcement. Further, when the switch S11 is closed, the announcement, which is being performed, is started over again from the beginning. When the switch S12 is closed, the announcement, which is being performed, is stopped, to make the next stage announcement. This embodiment is extremely convenient, since the same operation can be performed in accordance with the successive teachings to be brought about by the announcement. Further, according to this embodiment, an interruption operation is particularly provided. This is due to the fact that when such microcomputer incorporated in the acoustic signal generating circuit 2 as will be described later is outputting the acoustic signal, the start signal can not be received. For these purposes, the microcomputer with such interruption operation is arranged in a manner such that whenever the interruption signal is impressed onto the circuit 2, its program is adapted to jump to an input data receiving step. By such arrangement, voiced contents corresponding to either one of the depressed switch (S10, S11, S12) can be successively output. As far as this circuitry is concerned, the details have been already disclosed in, for example, U.S. Pat. No. 4,189,779 or Electronics/Aug. 31, 1978, Page 109 through Page 116.

Figure 16:
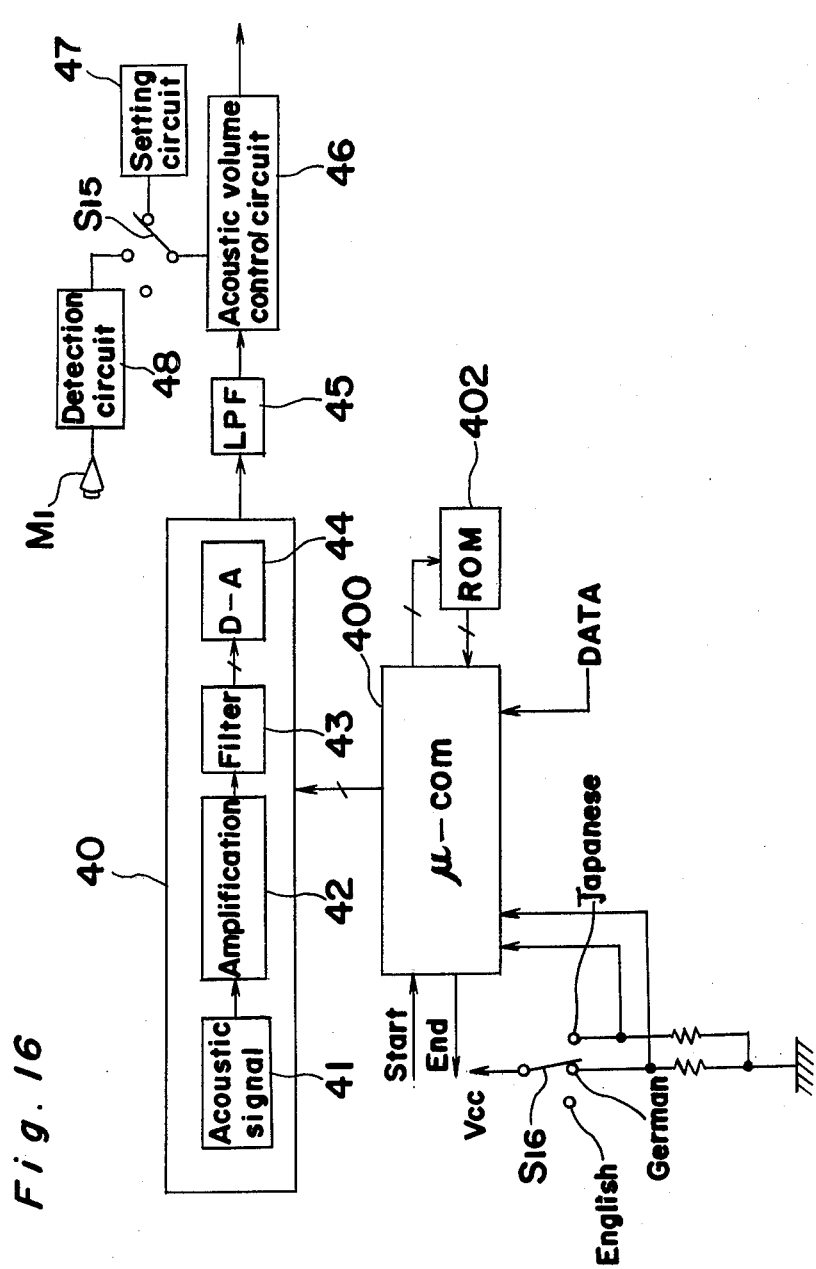
FIG. 16 illustrates a block diagram of an acoustic signal generating circuit, which is incorporated in each embodiment of the present invention.

FIG. 16 illustrates a circuit construction of the acoustic signal generating circuit 2. Numeral 40 designates means for making wave-forms in response to the acoustic signal input thereto. The signal from a D-A converter 44 is input into an acoustic volume control circuit 46 through a low pass filter 45, from which the acoustic signal is output. Once a switch S15 is connected with a detection circuit 48, the acoustic signals of the certain volume corresponding to the level of noises detected by a mike MI are output. On the other hand, once the switch S15 is connected onto a setting circuit 47, signals whose volume can be manually controlled are adapted to be output. However, when the signal is not connected at all, signals of the given volume are output, consequently.

Numeral 400 designates a microcomputer ($\mu$-com), which controls means for synthesizing the voiced signals. Numeral 402 designates a ROM, in which data necessary for synthesizing the acoustic signals are stored. A switch S16 is ready for selecting one of the acoustic signals respectively corresponding to several languages. More specifically, when Japanese is selected, a signal carrying thereon (01) is input into the microcomputer 400, while a signal of (10) is input into the microcomputer 400, when German is selected. Further, when English is selected, a signal of (00) is input into the microcomputer 400. Area to be specified in the ROM 402 is different in accordance with such specific selection as described above. The switch stated above can be arranged to be optionally selected by the photographer. Alternately, chips of the ROM are arranged to be replaced during the manufacturing operations thereof according to respective countries.

Figure 17:
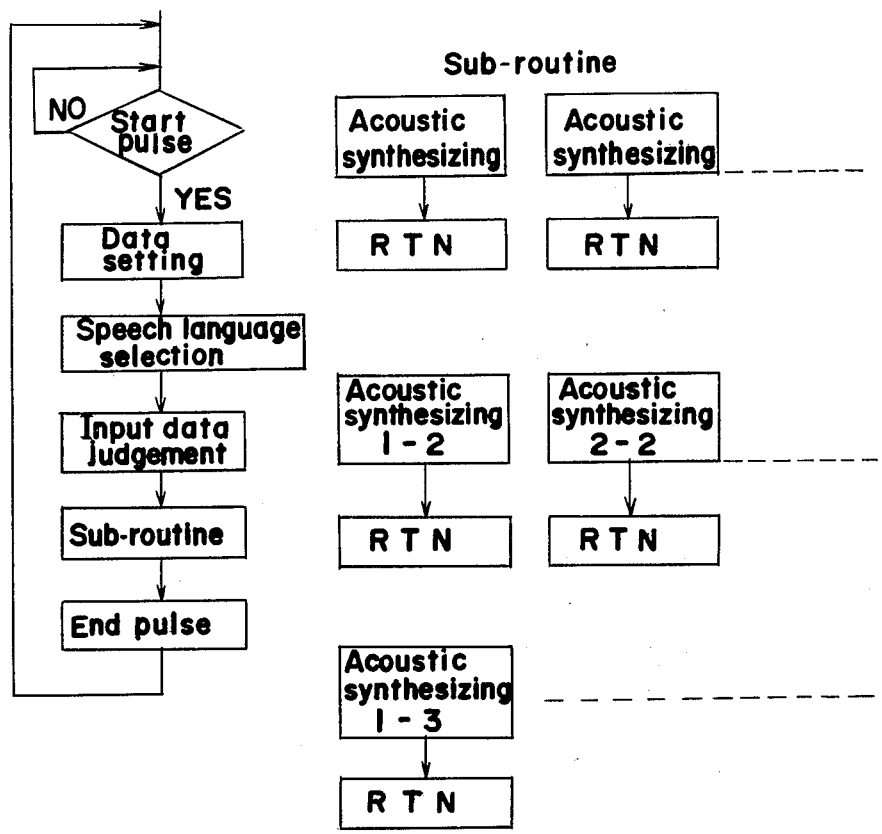
FIG. 17 illustrates a flow chart concerning an operation of a microcomputer together with a sub-routine incorporated thereto.

FIG. 17 illustrates a flow chart concerning the operation of the microcomputer ($\mu$-com) 400. In the flow chart, first, a start signal is waited for. In response to the input of the start signal, the data is taken out and set in. Successively, after a step for confirming a country-selection, the other data having been set is further judged. As the result of these judgements, the procedure is adapted to jump to a predetermined sub-routine. The sub-routine causes the circuit 40 to perform the operation in the selected language. Upon completion of the operation in accordance with the sub-routine, the procedure is adapted to return to the main routine, thereby to accomplish the content in the main routine.

Accordingly, soon after the end pulse is output, the operation is to return to the start of the main routine.

Figure 18:
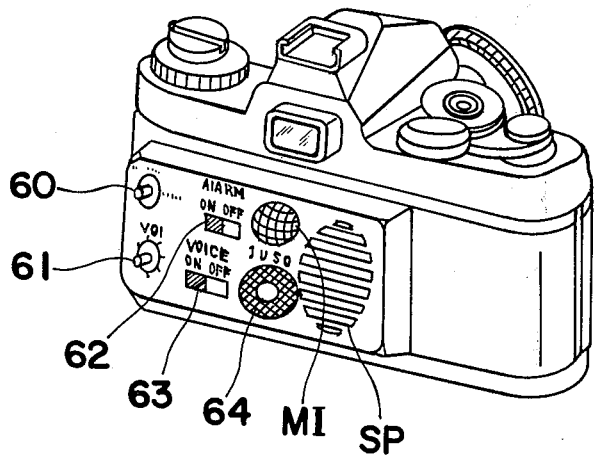
FIG. 18 is a rear perspective view of a camera provided with one of the arrangements in accordance with the present invention.

FIG. 18 shows a rear perspective view of a camera provided with one of the arrangements in accordance with the present invention. All of the appliances, through which the human voiced statements are given in accordance with the present invention, are provided in the vicinity of the rear lid of the camera. The symbol SP designates the speaker, while the mike or microphone is designated by MI. The mike MI detects the surrounding noise level. Numeral 60 designates a knob, with which the switch S15 shown in FIG. 16 is changed over. Numeral 61 designates a regulating knob for the acoustic volume setting member 47 shown in FIG. 16. Numeral 62 designates a slide, with which the switch S2 is changed over. Numeral 63 designates a slide switch for changing over the switch S3. Numeral 64 designates a member for operating a switch S16, which is ready for changing over for the selection among the countries.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A camera capable of informing a person of conditions of a camera by means of voice comprising:
   means for detecting a camera condition;
   means for selecting a plurality of information in a predetermined order in response to said detecting means;
   means for generating a voice to narrate said plurality of said information in said predetermined order; and
   means for producing a preparatory sound to call the attention of the person to the camera prior to the narration.

2. A camera as claimed in claim 1, wherein said producing means includes means for sounding a plurality of, sounds, the number of which is equal to that of the number of information to be narrated.

3. A camera as claimed in claim 1 wherein the camera includes a shutter release which upon actuation terminates the voice generation and preparatory sound generation means operations.

4. A camera capable of informing a person of conditions of a camera by means of voice comprising:
   means for detecting a camera condition;
   means for selecting a plurality of information in a predetermined order in response to said detecting means;
   means for generating a voice to narrate said plurality of said information in said predetermined order; and
   means for controlling said voice generating means to narrate only one of the information which is at the top of said predetermined order and advancing the narration to the next information in said order in response to a manual operation, said information being a plurality of steps of explanation of the way to handle the camera, and said controlling and advancing means including a member to be manually operated by the person who has understood the preceding step of explanation and wants to advance the next step.

5. A camera as claimed in claim 4, wherein said controlling and advancing means further includes a member for controlling said voice generating means to repeat the same step if the member is operated by a person who wants to listen to the same step again.

6. A camera as claimed in claim 5, wherein said controlling and advancing means further includes a member for controlling said voice generating means to return the narration to the top of said predetermined order if the member is operated by a person who wants to listen to the narration from the beginning again.

7. A camera capable of informing a person of conditions of a camera by means of voice comprising:
   means for detecting a camera condition;
   means for selecting a plurality of information in a predetermined order in response to said detecting means; and
   means for generating a voice to narrate said plurality of said information in said predetermined order, said camera being capable of a plurality of selectable exposure modes, and said detecting means including means for identifying the selected one of the exposure modes.

8. A camera as claimed in claim 7, wherein said detecting means further includes means for checking a plurality of possible abnormal conditions of the camera, and said selecting means includes means for determining the significance of the checked abnormal condition in the identified mode and arranging the information corresponding to the checked and significant abnormal conditions in the predetermined order to provide a warning.

9. A camera as claimed in claim 7, wherein said selecting means selects the information in response to the identified mode for narrating an explanation of the way to handle the camera in the selected mode.

10. A camera as claimed in claim 7, wherein after an effectuation of a photographic operation, a completion of said photographic operation is adapted to be voiced.

11. A camera as claimed in claim 9, wherein a statement setting forth said selected mode is adapted to be given as a preliminary statement of said explanation.

12. A camera as claimed in claim 11, wherein said camera is further adapted to provide when an exposure correction or an automatic exposure locking are being effected, such announcement that these are in operation is given by means of voice prior to said preliminary statement.

13. A camera capable of informing a person of conditions of a camera by means of voice comprising:
   means for checking possible abnormal conditions of the camera;
   means for identifying an exposure mode selected from a plurality of possible exposure modes;
   means for determining the significance of the checked abnormal condition in the identified mode; and
   means for generating a voice to narrate about said checked and significant abnormal condition for warning.

14. A camera as claimed in claim 13 wherein the camera includes a shutter release which upon actuation terminates the voice generation operation.

15. A camera capable of informing a person of conditions of a camera by means of voice comprising:
   means for checking possible abnormal conditions of the camera;
   means for generating a voice to narrate about said checked abnormal conditions for warning; and means for producing a preparatory sound to call the attention of the person to the camera prior to the narration which warns of the abnormal condition.

16. A camera as claimed in claim 15, wherein said producing means includes means for continuing the sound for a predetermined time before advancing to the narration.

17. A camera as claimed in claim 15, wherein said producing means includes means for continuing the sound until the person switches the camera to listen to the narration.

18. A camera as claimed in claim 15, wherein said producing means includes means for beginning the production of sound in response to the initial stage of a shutter release operation.

19. A camera as claimed in claim 15, wherein said voice generating means and said preparatory sound producing means are capable of being separately and selectably changeable into a silent condition, respectively.

20. A camera as claimed in claim 15 wherein the camera includes a shutter release which upon actuation terminates the voice generation means and preparatory sound means operations.

21. A camera as claimed in claim 15 further including an acoustical volume control means to vary the volume of the generated voice in response to the volume level of ambient noise.

22. A multi-mode acoustical camera for providing audio comments on the operation of the camera comprising:
a camera body;
detection means in the camera body for monitoring predetermined operating functions of the camera in both an aperture priority and shutter priority mode of operation and providing a resulting signal indicative of any abnormal conditions;
means for determining which mode of operation is selected;
means for determining from the detection means signals the relative significance of any abnormal conditions to the other abnormal conditions, if any, detected in a particular mode of operation;
means for alerting the user of the existence of abnormal conditions prior to any picture taking, and
means for producing audible predetermined word comments in a prearranged sequence based on the determination of the means for determining significance of the abnormal conditions.

23. The invention of claim 22 wherein the means for alerting the user includes an audio alarm and means for activating the audio alarm to generate a predetermined timed period of sound for each abnormal condition detected.

24. The invention of claim 22 further including an acoustical volume control means to vary the volume of word comments in direct response to the volume level of ambient noise including a microphone mounted in the camera body.

25. The invention of claim 22 wherein the means for producing audible predetermined word comments further includes a memory means for storing a plurality of predetermined word comments in at least two different languages and means for selecting a particular language.

* * * * *